United States Patent
Wagner et al.

(10) Patent No.: US 10,884,787 B1
(45) Date of Patent: Jan. 5, 2021

(54) EXECUTION GUARANTEES IN AN ON-DEMAND NETWORK CODE EXECUTION SYSTEM

(71) Applicant: Amazon Technologies, Inc., Seattle, WA (US)

(72) Inventors: Timothy Allen Wagner, Seattle, WA (US); Marc John Brooker, Seattle, WA (US); Jonathan Paul Thompson, Seattle, WA (US); Ajay Nair, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 15/275,181

(22) Filed: Sep. 23, 2016

(51) Int. Cl.
G06F 9/48 (2006.01)
G06F 11/36 (2006.01)

(52) U.S. Cl.
CPC ........ G06F 9/4843 (2013.01); G06F 11/3612 (2013.01)

(58) Field of Classification Search
CPC ..... G06F 2209/5011; G06F 2209/5019; G06F 9/45533; G06F 9/5077
See application file for complete search history.

(56) References Cited

U.S. PATENT DOCUMENTS

| | | |
|---|---|---|
| 4,949,254 A | 8/1990 | Shorter |
| 5,283,888 A | 2/1994 | Dao et al. |
| 5,970,488 A | 10/1999 | Crowe et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,708,276 B1 | 3/2004 | Yarsa et al. |

(Continued)

FOREIGN PATENT DOCUMENTS

| | | |
|---|---|---|
| EP | 2663052 A1 | 11/2013 |
| JP | 2002287974 A | 10/2002 |

(Continued)

OTHER PUBLICATIONS

Anonymous: "Docker run reference", Dec. 7, 2015, XP055350246, Retrieved from the Internet:URL:web.archive.org/web/20151207111702/docs.docker.com/engine/reference/run/[retrieved on Feb. 28, 2017].

(Continued)

*Primary Examiner* — Jorge A Chu Joy-Davila
(74) *Attorney, Agent, or Firm* — Knobbe, Martens, Olson & Bear, LLP

(57) ABSTRACT

Systems and methods are described for implementing execution guarantees in an on-demand code execution system or other distributed code execution environment, such that the on-demand code execution system attempts to execute code only a desired number of times. The on-demand code execution system can utilize execution identifiers to distinguish between new and duplicative requests, and can decline to allocate computing resources for duplicative requests. The on-demand code execution system can further detect errors during execution, and rollback the execution to undo the execution's effects. The on-demand code execution system can then restart execution until the code has been execute the desired number of times.

18 Claims, 6 Drawing Sheets

(56) References Cited

U.S. PATENT DOCUMENTS

| | | | |
|---|---|---|---|
| 7,036,121 B1 | 4/2006 | Casabona et al. |
| 7,590,806 B2 | 9/2009 | Harris et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B1 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,429,282 B1 | 4/2013 | Ahuja |
| 8,448,165 B1 | 5/2013 | Conover |
| 8,490,088 B2 | 7/2013 | Tang |
| 8,555,281 B1 | 10/2013 | Van Dijk et al. |
| 8,566,835 B2 | 10/2013 | Wang et al. |
| 8,613,070 B1 | 12/2013 | Borzycki et al. |
| 8,631,130 B2 | 1/2014 | Jackson |
| 8,677,359 B1 | 3/2014 | Cavage et al. |
| 8,694,996 B2 | 4/2014 | Cawlfield et al. |
| 8,700,768 B2 | 4/2014 | Benari |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,236 B1 | 8/2014 | Azari et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,874,952 B2 | 10/2014 | Tameshige et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 6/2015 | Oh et al. |
| 9,092,837 B2 | 7/2015 | Bala et al. |
| 9,098,528 B2 | 8/2015 | Wang |
| 9,110,732 B1 | 8/2015 | Forschmiedt et al. |
| 9,110,770 B1 | 8/2015 | Raju et al. |
| 9,111,037 B1 * | 8/2015 | Nalis | G06F 11/3664 |
| 9,112,813 B2 | 8/2015 | Jackson |
| 9,141,410 B2 | 9/2015 | Leafe et al. |
| 9,146,764 B1 | 9/2015 | Wagner |
| 9,152,406 B2 | 10/2015 | De et al. |
| 9,164,754 B1 | 10/2015 | Pohlack |
| 9,183,019 B2 | 11/2015 | Kruglick |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 | 8/2016 | Reque et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 * | 12/2016 | Dow | G06Q 10/06315 |
| 9,537,788 B2 | 1/2017 | Reque et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,767,271 B2 | 9/2017 | Ghose |
| 9,785,476 B2 | 10/2017 | Wagner et al. |
| 9,787,779 B2 | 10/2017 | Frank et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 10,002,026 B1 | 6/2018 | Wagner |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,162,672 B2 | 12/2018 | Wagner et al. |
| 10,162,688 B2 | 12/2018 | Wagner |
| 10,248,467 B2 | 4/2019 | Wisniewski et al. |
| 10,277,708 B2 | 4/2019 | Wagner et al. |
| 10,203,990 B2 | 5/2019 | Wagner et al. |
| 10,303,492 B1 | 5/2019 | Wagner et al. |
| 10,353,678 B1 | 7/2019 | Wagner |
| 10,353,746 B2 | 7/2019 | Reque et al. |
| 10,365,985 B2 | 7/2019 | Wagner |
| 10,387,177 B2 | 8/2019 | Wagner et al. |
| 10,402,231 B2 | 9/2019 | Marriner et al. |
| 10,437,629 B2 | 10/2019 | Wagner et al. |
| 10,528,390 B2 | 1/2020 | Brooker et al. |
| 10,552,193 B2 | 2/2020 | Wagner et al. |
| 10,564,946 B1 | 2/2020 | Wagner et al. |
| 10,572,375 B1 | 2/2020 | Wagner |
| 10,592,269 B2 | 3/2020 | Wagner et al. |
| 2001/0044817 A1 | 11/2001 | Asano et al. |
| 2002/0120685 A1 | 8/2002 | Srivastava et al. |
| 2002/0172273 A1 | 11/2002 | Baker et al. |
| 2003/0071842 A1 | 4/2003 | King et al. |

(56) References Cited

U.S. PATENT DOCUMENTS

| | | |
|---|---|---|
| 2003/0084434 A1 | 5/2003 | Ren |
| 2003/0229794 A1 | 12/2003 | James, II et al. |
| 2004/0003087 A1 | 1/2004 | Chambliss et al. |
| 2004/0049768 A1 | 3/2004 | Matsuyama et al. |
| 2004/0098154 A1 | 5/2004 | Mccarthy |
| 2004/0158551 A1* | 8/2004 | Santosuosso ..... G06F 16/24542 |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0174419 A1 | 7/2007 | O'Connell et al. |
| 2007/0192082 A1* | 8/2007 | Gaos ..... G06F 9/455 703/27 |
| 2007/0199000 A1 | 8/2007 | Shekhel et al. |
| 2007/0220009 A1 | 9/2007 | Morris et al. |
| 2007/0240160 A1 | 10/2007 | Paterson-Jones |
| 2007/0255604 A1 | 11/2007 | Seelig |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Husain |
| 2008/0209423 A1 | 8/2008 | Hirai |
| 2009/0006897 A1 | 1/2009 | Sarsfield |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0177860 A1 | 7/2009 | Zhu et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2010/0312871 A1 | 12/2010 | Desantis et al. |
| 2010/0325727 A1 | 12/2010 | Neystadt et al. |
| 2011/0010722 A1 | 1/2011 | Matsuyama |
| 2011/0029970 A1 | 2/2011 | Arasaratnam |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0314465 A1 | 12/2011 | Smith et al. |
| 2011/0321033 A1 | 12/2011 | Kelkar et al. |
| 2012/0011496 A1 | 1/2012 | Shimamura |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072762 A1 | 3/2012 | Atchison et al. |
| 2012/0072914 A1 | 3/2012 | Ota |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0131379 A1 | 5/2012 | Tameshige et al. |
| 2012/0144290 A1 | 6/2012 | Goldman et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0222038 A1 | 8/2012 | Katragadda et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067484 A1* | 3/2013 | Sonoda ..... G06F 9/4818 718/103 |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |

(56) References Cited

U.S. PATENT DOCUMENTS

| | | |
|---|---|---|
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0152047 A1 | 6/2013 | Moorthi et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0185719 A1 | 7/2013 | Kar et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | Mcgrath |
| 2013/0227641 A1 | 8/2013 | White et al. |
| 2013/0227710 A1 | 8/2013 | Barak et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0311650 A1 | 11/2013 | Brandwine et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068611 A1 | 3/2014 | McGrath et al. |
| 2014/0081984 A1 | 3/2014 | Sitsky et al. |
| 2014/0082165 A1 | 3/2014 | Marr et al. |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault et al. |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304698 A1 | 10/2014 | Chigurapati et al. |
| 2014/0304815 A1 | 10/2014 | Maeda |
| 2014/0317617 A1* | 10/2014 | O'Donnell .......... G06F 9/45533 718/1 |
| 2014/0344457 A1 | 11/2014 | Bruno, Jr. et al. |
| 2014/0344736 A1 | 11/2014 | Ryman et al. |
| 2014/0380085 A1 | 12/2014 | Rash et al. |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0052258 A1 | 2/2015 | Johnson et al. |
| 2015/0058914 A1 | 2/2015 | Yadav |
| 2015/0067830 A1 | 3/2015 | Johansson et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0134626 A1 | 5/2015 | Theimer et al. |
| 2015/0135287 A1 | 5/2015 | Medeiros et al. |
| 2015/0142952 A1 | 5/2015 | Bragstad et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0227598 A1 | 8/2015 | Hahn et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0370560 A1 | 12/2015 | Tan et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0012099 A1 | 1/2016 | Tuatini et al. |
| 2016/0019536 A1 | 1/2016 | Ortiz et al. |
| 2016/0026486 A1 | 1/2016 | Abdallah |
| 2016/0048606 A1 | 2/2016 | Rubinstein et al. |
| 2016/0072727 A1 | 3/2016 | Leafe et al. |
| 2016/0077901 A1 | 3/2016 | Roth et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0124665 A1* | 5/2016 | Jain ..................... G06F 3/0619 711/162 |
| 2016/0140180 A1 | 5/2016 | Park et al. |
| 2016/0191420 A1 | 6/2016 | Nagarajan et al. |
| 2016/0224360 A1 | 8/2016 | Wagner et al. |
| 2016/0224785 A1 | 8/2016 | Wagner et al. |
| 2016/0239318 A1 | 8/2016 | Wagner |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0299790 A1 | 10/2016 | Thompson |
| 2016/0301739 A1 | 10/2016 | Thompson |
| 2016/0306613 A1 | 10/2016 | Busi et al. |
| 2016/0350099 A1 | 12/2016 | Suparna et al. |
| 2016/0357536 A1 | 12/2016 | Firlik et al. |
| 2016/0364265 A1 | 12/2016 | Cao et al. |
| 2016/0371127 A1 | 12/2016 | Antony et al. |
| 2016/0371156 A1 | 12/2016 | Merriman |

(56) References Cited

U.S. PATENT DOCUMENTS

| | | |
|---|---|---|
| 2016/0378449 A1 | 12/2016 | Khazanchi et al. |
| 2016/0378554 A1 | 12/2016 | Gummaraju et al. |
| 2017/0041309 A1 | 2/2017 | Ekambaram et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085591 A1 | 3/2017 | Ganda et al. |
| 2017/0090961 A1 | 3/2017 | Wagner et al. |
| 2017/0093684 A1 | 3/2017 | Jayaraman et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0230499 A1 | 8/2017 | Mumick et al. |
| 2017/0272462 A1 | 9/2017 | Kraemer et al. |
| 2017/0286143 A1 | 10/2017 | Wagner et al. |
| 2017/0286156 A1 | 10/2017 | Wagner et al. |
| 2017/0346808 A1* | 11/2017 | Anzai ............... H04L 63/10 |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |
| 2018/0004572 A1 | 1/2018 | Wagner et al. |
| 2018/0039506 A1 | 2/2018 | Wagner et al. |
| 2018/0046453 A1* | 2/2018 | Nair ............... G06F 11/3684 |
| 2018/0046482 A1 | 2/2018 | Karve et al. |
| 2018/0060221 A1* | 3/2018 | Yim ............... G06F 11/3684 |
| 2018/0067841 A1 | 3/2018 | Mahimkar |
| 2018/0121245 A1 | 5/2018 | Wagner et al. |
| 2018/0143865 A1 | 5/2018 | Wagner et al. |
| 2018/0157568 A1 | 6/2018 | Wagner |
| 2018/0203717 A1 | 7/2018 | Wagner et al. |
| 2018/0210760 A1 | 7/2018 | Wisniewski et al. |
| 2018/0275987 A1 | 9/2018 | Vandeputte |
| 2018/0309819 A1 | 10/2018 | Thompson |
| 2019/0050271 A1 | 2/2019 | Marriner et al. |
| 2019/0072529 A1 | 3/2019 | Andrawes et al. |
| 2019/0073234 A1 | 3/2019 | Wagner et al. |
| 2019/0102231 A1 | 4/2019 | Wagner |
| 2019/0108058 A1 | 4/2019 | Wagner et al. |
| 2019/0155629 A1 | 5/2019 | Wagner et al. |
| 2019/0171470 A1 | 6/2019 | Wagner |
| 2019/0196884 A1 | 6/2019 | Wagner |
| 2019/0205171 A1 | 7/2019 | Brooker et al. |
| 2019/0227849 A1 | 7/2019 | Wisniewski et al. |
| 2019/0384647 A1 | 12/2019 | Reque et al. |
| 2020/0057680 A1 | 2/2020 | Marriner et al. |

FOREIGN PATENT DOCUMENTS

| | | |
|---|---|---|
| JP | 2006-107599 A | 4/2006 |
| JP | 2007-538323 A | 12/2007 |
| JP | 2010-026562 A | 2/2010 |
| JP | 2011-233146 A | 11/2011 |
| JP | 2011257847 A | 12/2011 |
| JP | 2013-156996 A | 8/2013 |
| JP | 2014-525624 A | 9/2014 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| WO | WO 2008/114454 A1 | 9/2008 |
| WO | WO 2009/137567 A1 | 11/2009 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |

OTHER PUBLICATIONS

Amazon, "AWS Lambda: Developer Guide", Retrieved from the Internet, Jun. 26, 2016, URL: docs.aws.amazon.com/lambda/latest/dg/lambda-dg.pdf.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Das et al., Adaptive Stream Processing using Dynamic Batch Sizing, 2014, 13 pages.
Hoffman, Auto scaling your website with Amazon Web Services (AWS)—Part 2, Cardinalpath, Sep. 2015, 15 pages.
Yue et al., AC 2012-4107: Using Amazon EC2 in Computer and Network Security Lab Exercises: Design, Results, and Analysis, 2012, American Society for Engineering Education 2012.
International Preliminary Report on Patentability in PCT/US2015/052810 dated Apr. 4, 2017.
International Preliminary Report on Patentability in PCT/US2015/052838 dated Apr. 4, 2017.
International Preliminary Report on Patentability in PCT/US2015/052833 dated Apr. 4, 2017.
International Preliminary Report on Patentability in PCT/US2015/064071 dated Jun. 6, 2017.
International Preliminary Report on Patentability in PCT/US2016/016211 dated Aug. 17, 2017.
International Preliminary Report on Patentability in PCT/US2016/026514 dated Oct. 10, 2017.
International Preliminary Report on Patentability in PCT/US2016/026520 dated Oct. 10, 2017.
International Search Report and Written Opinion in PCT/US2016/066997 dated Mar. 20, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.
Adapter Pattern, Wikipedia, en.wikipedia.org/w/index.php?title=Adapter_pattern&oldid=654971255, [retrieved May 26, 2016], 6 pages.
Czajkowski, G., and L. Daynes, Multitasking Without Compromise: A Virtual Machine Evolution 47(4a):60-73, ACM SIGPLAN Notices—Supplemental Issue, Apr. 2012.
Dombrowski, M., et al., Dynamic Monitor Allocation in the Java Virtual Machine, JTRES '13, Oct. 9-11, 2013, pp. 30-37.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Shim (computing), Wikipedia, en.wikipedia.org/w/index.php?title+Shim_(computing)&oldid+654971528, [retrieved on May 26, 2016], 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.

(56) References Cited

OTHER PUBLICATIONS

Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Search Report and Written Opinion in PCT/US2015/052838 dated Dec. 18, 2015.
International Search Report and Written Opinion in PCT/US2015/052833 dated Jan. 13, 2016.
International Search Report and Written Opinion in PCT/US2015/064071 dated Mar. 16, 2016.
International Search Report and Written Opinion in PCT/US2016/016211 dated Apr. 13, 2016.
International Search Report and Written Opinion in PCT/US2016/026514 dated Jun. 8, 2016.
International Search Report and Written Opinion in PCT/US2016/026520 dated Jul. 5, 2016.
International Search Report and Written Opinion in PCT/US2016/054774 dated Dec. 16, 2016.
Amazon, "AWS Lambda: Developer Guide", Retrieved from the Internet, 2019, URL : docs.aws.amazon.com/lambda/ latest/dg/lambda-dg.pdf, 521 pages.
Bhadani et al., Performance evaluation of web servers using central load balancing policy over virtual machines on cloud, Jan. 2010, 4 pages.
Deis, Container, 2014, 1 page.
Han et al., Lightweight Resource Scaling for Cloud Applications, 2012, 8 pages.
Kamga et al., Extended scheduler for efficient frequency scaling in virtualized systems, Jul. 2012, 8 pages.
Kazempour et al., AASH: an asymmetry-aware scheduler for hypervisors, Jul. 2010, 12 pages.
Kraft et al., 10 performance prediction in consolidated virtualized environments, Mar. 2011, 12 pages.
Krsul et al., "VMPlants: Providing and Managing Virtual Machine Execution Environments for Grid Computing", Supercomputing, 2004. Proceedings of the ACM/IEEESC 2004 Conference Pittsburgh, PA, XP010780332, Nov. 6-12, 2004, 12 pages.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, 2013, <hal-01228236, pp. 81-89.
Sakamoto, et al. "Platform for Web Services using Proxy Server"; Research Report from Information Processing Society, Mar. 22, 2002, vol. 2002, No. 31.
Stack Overflow, Creating a database connection pool, 2009, 4 pages.
Tan et al., Provisioning for large scale cloud computing services, Jun. 2012, 2 pages.
Wang et al., "Improving utilization through dynamic VM resource allocation in hybrid cloud environment", Parallel and Distributed V Systems (ICPADS), IEEE, 2014. Retrieved on Feb. 14, 2019, Retrieved from the internet: URL ieeexplore.ieee.org/stamp/stamp.jsp?tp=&arnumber=7097814, 8 pages.
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Extended Search Report in European Application No. 15846932.0 dated May 3, 2018.
Extended Search Report in European Application No. 15847202.7 dated Sep. 9, 2018.
Extended Search Report in European Application No. 15846542.7 dated Aug. 27, 2018.
International Preliminary Report on Patentability in PCT/US2016/054774 dated Apr. 3, 2018.
International Preliminary Report on Patentability in PCT/US2016/066997 dated Jun. 26, 2018.
International Preliminary Report on Patentability in PCT/US/2017/023564 dated Oct. 2, 2018.
International Preliminary Report on Patentability in PCT/US2017/040054 dated Jan. 1, 2019.
International Preliminary Report on Patentability in PCT/US2017/039514 dated Jan. 1, 2019.
CodeChef ADMIN discussion web page, retrieved from discuss.codechef.com/t/what-are-the-memory-limit-and-stack-size-on-codechef/14159, 2019.
CodeChef IDE web page, Code, Compile, & Run, retrieved from codechef.com/ide, 2019.
Dynamic HTML, Wikipedia page from date Mar. 27, 2015, retrieved using the WayBackMachine, from web.archive.org/web/20150327215418/en.wikipedia.org/wiki/Dynamic_HTML, 2015, 6 pages.
discuss.codechef.com discussion web page from date Nov. 11, 2012, retrieved using the WayBackMachine, from web.archive.org/web/20121111040051/discuss.codechef.com/questions/2881 /why-are-simple-java-programs-using-up-so-much-space, 2012.
https://www.codechef.com code error help page from Jan. 2014, retrieved from https://www.codechef.com/JAN14/status/ERROR,va123, 2014.
www.codechef.com/ide web page from date Apr. 5, 2015, retrieved using the WayBackMachine, from web.archive.org/web/20150405045518/codechef.com/ide, 2015.
Kato, et al. "Web Service Conversion Architecture of the Web Application and Evaluation"; Research Report from Information Processing Society, Apr. 3, 2006 with Machine Translation.
Wikipedia List_of_HTTP status_codes web page, retrieved from en.wikipedia.org/wiki/List_of_HTTP status_codes, 2019.
Wikipedia Recursion web page from date Mar. 26, 2015, retrieved using the WayBackMachine, from web.archive.org/web/20150326230100/en.wikipedia.org/wiki/Recursion_(computer_science), 2015.
Wikipedia subroutine web page, retrieved from en.wikipedia.org/wiki/Subroutine, 2019.
Wikipedia "API" pages from date Apr. 7, 2015, retrieved using the WayBackMachine from web.archive.org/web/20150407191158/en.wikipedia.org/wiki/Application_programming_interface.
Extended European Search Report in application No. 17776325.7 dated Oct. 23, 2019.
Office Action in European Application No. 17743108.7 dated Jan. 14, 2020.

* cited by examiner

EXECUTION GUARANTEES IN AN ON-DEMAND NETWORK CODE EXECUTION SYSTEM

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
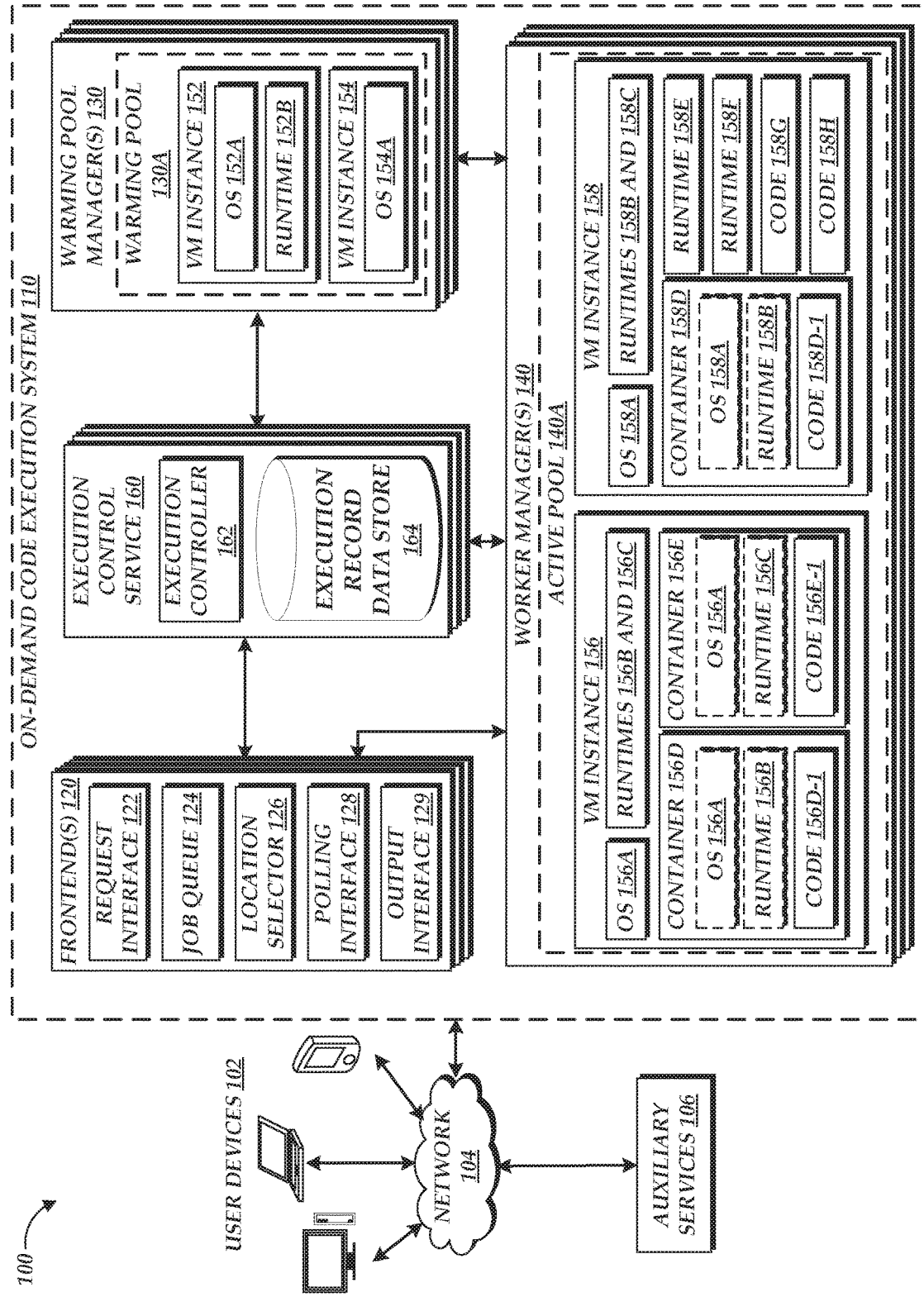
FIG. 1 is a block diagram depicting an illustrative environment in which an on-demand code execution environment can operate to execute tasks, to guarantee that execution occurs a desired number of times, and to rollback effects of partial or erroneous executions.

Generally described, aspects of the present disclosure relate to implementing execution guarantees for tasks executed in an on-demand code execution environment, and more specifically, to implementing protocols that attempt to ensure a task is executed only a desired number of times by monitoring states of an execution, rolling back effects of an erroneous execution, and maintaining an execution record that is verified at each execution to ensure that the task executes the desired number of times. As described in detail herein, an on-demand code execution environment may provide a network-accessible service enabling users to submit or designate computer-executable code to be executed by virtual machine instances on the on-demand code execution environment. Each set of code on the on-demand code execution environment may define a "task," and implement specific functionality corresponding to that task when executed on a virtual machine instance of the on-demand code execution environment. Individual implementations of the task on the on-demand code execution environment may be referred to as an "execution" of the task. The on-demand code execution environment can further enable users to trigger execution of a task based on a variety of potential events, such as transmission of an application programming interface ("API") call or a specially formatted hypertext transport protocol ("HTTP") packet. Thus, users may utilize the on-demand code execution environment to execute any specified executable code "on-demand," without requiring configuration or maintenance of the underlying hardware or infrastructure on which the code is executed. Further, the on-demand code execution environment may be configured to execute tasks in a rapid manner (e.g., in under 100 milliseconds [ms]), thus enabling execution of tasks in "real-time" (e.g., with little or no perceptible delay to an end user). To enable this rapid execution, the on-demand code execution environment can include one or more virtual machine instances that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the virtual machine instance. Thus, when an execution of a task is triggered, the code corresponding to that task can be executed within a pre-initialized virtual machine in a very short amount of time.

Often, it is desirable that code execute no less and no more than a specified number of times. For example, code that processes files uploaded to a network-accessible database may be required to execute once and only once for each uploaded file. In many instances, verifications are placed directly into code to ensure proper execution. For example, code that should execute once and only once may verify that no prior execution of the code has occurred before proceeding. However, use of in-code verifications can be problematic in an on-demand code execution environment, due to the rapid and distributed nature of the environment. For example, delays caused by an in-code call to check an external data source (e.g., a network-accessible database) for the state of prior executions may significantly increase the run-time of an execution, which can be especially problematic for a task that is intended to execute rapidly (e.g., in under 100 ms). Moreover, multiple calls to a task in a short period of time may result in multiple executions, even when the task is intended to run once and only once, since each in-code verification may complete prior to the alternative task noting that it has begun execution. Still further, the use of in-code verification can increase the computing resources used by the on-demand code execution environment, since such execution of the in-code verification requires allocation of resources to execute the code of the task (e.g., allocation of a virtual machine or other execution environment and its associated computing resources).

Aspects of the present disclosure address these difficulties, by providing an on-demand code execution environment that functions to maintain execution records of tasks, to ensure that tasks are executed only a desired number of times based on the execution records, and to rollback executions that do not complete successfully. As discussed in more detail below, the on-demand code execution environment can associate each task execution with an execution identifier, and can maintain an execution record based on those identifiers to ensure that computing resources are allocated only for valid executions of a task (e.g., executions that do not exceed the maximum desired number of executions for a task), even in instances where the task is called for execution multiple times. This can increase the efficiency of the on-demand code execution environment, by reducing or eliminating the need to allocate computing resources to tasks that would otherwise exit without substantial operation (e.g., due to the required number of executions already being executed or having completed). Moreover, embodiments of the present disclosure may propagate execution identifiers within calls to other tasks or external services, such that those other tasks or external services can also implement execution guarantees (e.g., a "guarantee" that the execution occurs n and only n times). Still further, embodiments of the present disclosure may monitor for erroneous executions of a task, and implement "rollbacks" or "undo" functionality for instances in which tasks do not execute successfully, such that erroneous executions neither have detrimental effect nor inhibit subsequent executions of the task. Thus, embodiments of the present disclosure can enable execution guarantees that attempt to ensure that a task call causes only a desired number of corresponding executions of the task.

While the phrase "execution guarantee" is used herein to describe functionality enabling a task to execution only a desired number of times (e.g., n and only n times), the use of this phrase is not intended to imply that such functionality is infallible. Rather, the embodiments disclosed herein attempt to ensure that a task executes only a desired number of times, within the constraints of the disclosed embodiments and subject to the restrictions of the utilized computing devices.

As will be appreciated by one of skill in the art in light of the present disclosure, the embodiments disclosed herein improves the ability of computing systems, such as on-demand code execution environments, to efficiently execute user-provided code in a rapid manner, and subject to execution constraints. Specifically, aspects of the present disclosure improve the ability of on-demand code execution environments to implement execution guarantees, such that tasks are executed only a desired number of times and such that subsequent invalid requests to execute the task (e.g., subsequent request to execute the task more than a desired number of times) are handled using reduced computing resources (e.g., without allocating computing resources to execute the subsequent executions). Moreover, the presently disclosed embodiments address technical problems inherent within computing systems; specifically, the difficulty in implementing execution guarantees for code executed via on-demand code execution systems, while reducing associated computing resources and providing rapid, parallelized executions. These technical problems are addressed by the various technical solutions described herein, including the implementation of execution records at the on-demand code execution system, the use of such execution records to prevent duplicative or otherwise invalid executions, and the implementation of rollback/undo procedures to properly handle erroneous executions. Thus, the present disclosure represents an improvement on existing content streaming systems and computing systems in general.

The execution of tasks on the on-demand code execution environment will now be discussed. Specifically, to execute tasks, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user (a "task"), which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives user-initiated requests to execute code, and identifies a pre-configured virtual machine instance to execute the code based on configuration information associated with the request. The virtual machine instance manager can further allocate the identified virtual machine instance to execute the user's code at least partly by creating and configuring containers inside the allocated virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

While a virtual machine executing an operating system is described herein as one example of an execution environment, other execution environments are also possible. For example, tasks or other processes may be executed within a software "container," which provides a runtime environment without itself providing virtualization of hardware. Containers may be implemented within virtual machines to provide additional security, or may be run outside of a virtual machine instance.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which an on-demand code execution system 110 may operate based on communication with user computing devices 102 and auxiliary services 106. By way of illustration, various example user computing devices 102 are shown in communication with the on-demand code execution system 110, including a desktop computer, laptop, and a mobile phone. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The on-demand code execution system 110 may provide the user computing devices 102 with one or more user interfaces, command-line interfaces (CLI), application programing interfaces (API), and/or other programmatic interfaces for generating and uploading user-executable code, invoking the user-provided code (e.g., submitting a request to execute the user codes on the on-demand code execution system 110), scheduling event-based jobs or timed jobs, tracking the user-provided code, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the one-demand code execution environment 110 to implement desired functionality on behalf of a user. Auxiliary services 106 can correspond to network-connected computing devices, such as servers, which generate data accessible to the one-demand code execution environment 110 or otherwise communicate to the one-demand code execution environment 110. For example, the auxiliary services 106 can include web services (e.g., associated with the user computing devices 102, with the on-demand code execution system 110, or with third parties), data bases, really simple syndication ("RSS") readers, social networking sites, or any other source of network-accessible service or data source. In some instances, auxiliary services 106 may be associated with the on-demand code execution system 110, e.g., to provide billing or logging services to the on-demand code execution system 110. In some instances, auxiliary services 106 actively transmit information, such as API calls or other task-triggering information, to the on-demand code execution system 110. In other instances, auxiliary services 106 may be passive, such that data is made available for access by the on-demand code execution system 110. As described below, components of the on-demand code execution system 110 may periodically poll such passive data sources, and trigger execution of tasks within the on-demand code execution system 110 based on the data provided. While depicted in FIG. 1 as distinct from the user computing devices 102 and the on-demand code execution system 110, in some embodiments, various auxiliary services 106 may be implemented by either the user computing devices 102 or the on-demand code execution system 110.

The user computing devices 102 and auxiliary services 106 may communication with the on-demand code execution system 110 via network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution system 110 is depicted in FIG. 1 as operating in a distributed computing environment including several computer systems that are interconnected using one or more computer networks (not shown in FIG. 1). The on-demand code execution system 110 could also operate within a computing environment having a fewer or greater number of devices than are illustrated in FIG. 1. Thus, the depiction of the on-demand code execution system 110 in FIG. 1 should be taken as illustrative and not limiting to the present disclosure. For example, the on-demand code execution system 110 or various constituents thereof could implement various Web services components, hosted or "cloud" computing environments, and/or peer to peer network configurations to implement at least a portion of the processes described herein.

Further, the on-demand code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the on-demand code execution system 110 is illustrated as connected to the network 104. In some embodiments, any of the components within the on-demand code execution system 110 can communicate with other components of the on-demand code execution system 110 via the network 104. In other embodiments, not all components of the on-demand code execution system 110 are capable of communicating with other components of the virtual environment 100. In one example, only the frontends 120 may be connected to the network 104, and other components of the on-demand code execution system 110 may communicate with other components of the environment 100 via the frontends 120.

In FIG. 1, users, by way of user computing devices 102, may interact with the on-demand code execution system 110 to provide executable code, and establish rules or logic defining when and how such code should be executed on the on-demand code execution system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the on-demand code execution system 110, and request that the on-demand code execution system 110 execute the code using one or more pre-established virtual machine instances. The on-demand code execution system 110 can handle the acquisition and configuration of compute capacity (e.g., containers, instances, etc., which are described in greater detail below) based on the code execution request, and execute the code using the compute capacity. The on-demand code execution system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus over-paying).

To enable interaction with the on-demand code execution system 110, the environment 110 includes one or more frontends 120, which enable interaction with the on-demand code execution system 110. In an illustrative embodiment, the frontends 120 serve as a "front door" to the other services provided by the on-demand code execution system 110, enabling users (via user computing devices 102) to provide, request execution of, and view results of computer executable code. The frontends 120 include a variety of components to enable interaction between the on-demand code execution system 110 and other computing devices. For example, each frontend 120 may include a request interface 122 providing user computing devices 102 with the ability to upload or otherwise communication user-specified code to the on-demand code execution system 110 and to thereafter request execution of that code. In one embodiment, the request interface 122 communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code are referred to as "task executions" or simply "executions." Tasks may be written, by way of non-limiting example, in JavaScript (e.g., node.js), Java, Python, and/or Ruby (and/or another programming language). Tasks may be "triggered" for execution on the on-demand code execution system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the on-demand code execution system 110) prior to the request being received by the on-demand code execution system 110. The on-demand code execution system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface 122.

A call to execute a task may specify one or more third-party libraries (including native libraries) to be used along with the user code corresponding to the task. In one embodiment, the call may provide to the on-demand code execution system 110 a ZIP file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the on-demand code execution system 110 (e.g., standard routines), and/or provided by third parties. In some embodiments, such resource-level constraints (e.g., how much memory is to be allocated for executing a particular user code) are specified for the particular task, and may not vary over each execution of the task. In such cases, the on-demand code execution system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the on-demand code execution system 110 to access private resources (e.g., on a private network).

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the on-demand code execution system 110 may inspect the call and look for the flag or the header, and if it is present, the on-demand code execution system 110 may modify the behavior (e.g., logging facilities) of the container in which the task is executed, and cause the output data to be provided back to the user. In some embodiments, the behavior/mode indicators are added to the call by the user interface provided to the user by the on-demand code execution system 110. Other features such as source code profiling, remote debugging, etc. may also be enabled or disabled based on the indication provided in a call.

In accordance with embodiments of the present disclosure, user-submitted code for a task may include portions to assist in monitoring a state of the code, or for gracefully handling errors during execution. For example, code for a task may designate specific portions of code as indicating "success" with respect to one or more operations undertaken by the code. For example, the code may call a function or set a variable that indicates successful execution, even before all code for the task has completed executing. In some instances, a code may implement multiple operations, and call different "success" functions (or set multiple variables) for each operation. When executed, the on-demand code execution environment may use these functions or variables to record successful execution. In some instances, code may utilize similar functions or variables to record the beginning of one or more operations. In addition, user-submitted code may include executable instructions for "undoing" or rolling back all or part of an execution. For example, where the code includes one or more "do" functions, the code may also include one or more corresponding "undo" functions, such that a failed execution of a "do" function can be rolled back by calling of the corresponding undo function. As described below, the on-demand code execution environment may utilize these undo or rollback functions to gracefully handle erroneous executions. While some embodiments of the present disclosure may utilize or rely on in-code references to successful execution or in-code "undo" functionalities, other embodiments may operate without requiring any in-code modifications. For example, some embodiments of the present disclosure may mark successful execution by noting calls to an "exit" function, or by noting that code executed without any exceptions or errors. As a further example, some embodiments of the present disclosure may rollback or undo erroneous executions by reverting a state of the on-demand code execution environment to a state prior to the execution (e.g., by reverting virtual machine instances within the on-demand code execution environment to pre-execution states).

To manage requests for code execution, the frontend 120 can further include an execution queue 124, which can maintain a record of user-requested task executions. Illustratively, the number of simultaneous task executions by the on-demand code execution system 110 is limited, and as such, new task executions initiated at the on-demand code execution system 110 (e.g., via an API call) may be placed on the execution queue 124 and processed, e.g., in a first-in-first-out order. In some embodiments, the on-demand code execution system 110 may include multiple execution queues 124, such as individual execution queues 124 for each user account. For example, users of the on-demand code execution system 110 may desire to limit the rate of task executions on the on-demand code execution system 110 (e.g., for cost reasons). Thus, the on-demand code execution system 110 may utilize an account-specific execution queue 124 to throttle the rate of simultaneous task executions by a specific user account. In some instances, the on-demand code execution system 110 may prioritize task executions, such that task executions of specific accounts or of specified priorities bypass or are prioritized within the execution queue 124. In other instances, the on-demand code execution system 110 may execute tasks immediately or substantially immediately after receiving a call for that task, and thus, the execution queue 124 may be omitted.

As noted above, tasks may be triggered for execution at the on-demand code execution system 110 based on explicit calls from user computing devices 102 (e.g., as received at the request interface 122). Alternatively or additionally, tasks may be triggered for execution at the on-demand code execution system 110 based on data retrieved from one or more auxiliary services 106. To facilitate interaction with auxiliary services 106, the frontend 120 can include a polling interface 128, which operates to poll auxiliary services 106 for data. Illustratively, the polling interface 128 may periodically transmit a request to one or more user-specified auxiliary services 106 to retrieve any newly available data (e.g., social network "posts," news articles, etc.), and to determine whether that data corresponds to a user-established criteria triggering execution a task on the on-demand code execution system 110. Illustratively, criteria for execution of a task may include, but is not limited to, whether new data is available at the auxiliary services 106, the type or content of the data, or timing information corresponding to the data. In addition to tasks executed based on explicit user calls and data from auxiliary services 106, the on-demand code execution system 110 may in some instances operate to trigger execution of tasks independently. For example, the on-demand code execution system 110 may operate (based on instructions from a user) to trigger execution of a task at each of a number of specified time intervals (e.g., every 10 minutes).

The frontend 120 can further includes an output interface 129 configured to output information regarding the execution of tasks on the on-demand code execution system 110. Illustratively, the output interface 129 may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface 129 may further enable transmission of data, such as service calls, to auxiliary services 106. For example, the output interface 129 may be utilized during execution of a task to transmit an API request to an external service 106 (e.g., to store data generated during execution of the task).

As shown in FIG. 1, in some embodiments, the on-demand code execution system 110 may include multiple frontends 120. In such embodiments, a load balancer (not shown in FIG. 1) may be provided to distribute the incoming calls to the multiple frontends 120, for example, in a round-robin fashion. In some embodiments, the manner in which the load balancer distributes incoming calls to the multiple frontends 120 may be based on the location or state of other components of the on-demand code execution system 110. For example, a load balancer may distribute calls to a geographically nearby frontend 120, or to a frontend with capacity to service the call. In instances where each frontend 120 corresponds to an individual instance of another component of the on-demand code execution environment, such as the warming pools 130A or active pools 140A described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

To execute tasks, the on-demand code execution system 110 includes one or more warming pool managers 130, which "pre-warm" (e.g., initialize) virtual machine instances to enable tasks to be executed quickly, without the delay caused by initialization of the virtual machines. The on-demand code execution system 110 further includes one or more worker managers 140, which manage active virtual machine instances (e.g., currently assigned to execute tasks in response to task calls).

The warming pool managers 130 ensure that virtual machine instances are ready to be used by the worker managers 140 when the on-demand code execution system 110 detects an event triggering execution of a task on the on-demand code execution system 110. In the example illustrated in FIG. 1, each warming pool manager 130 manages a corresponding warming pool 130A, which is a group (sometimes referred to as a pool) of pre-initialized and pre-configured virtual machine instances that may be used to execute tasks in response to triggering of those tasks. In some embodiments, the warming pool managers 130 cause virtual machine instances to be booted up on one or more physical computing machines within the on-demand code execution system 110 and added to a corresponding warming pool 130A. For example, each warming pool manager 130 may cause additional instances to be added to the corresponding warming pool 130A based on the available capacity in the corresponding warming pool 130A to service incoming calls. As will be described below, the warming pool managers 130 may further work in conjunction with other components of the on-demand code execution system 110, such as the worker managers 140, to add or otherwise manage instances and/or containers in the warming pools 130A based on received pre-trigger notifications. In some embodiments, the warming pool managers 130 may use both physical computing devices within the on-demand code execution system 110 and one or more virtual machine instance services to acquire and maintain compute capacity that can be used to service calls received by the frontends 120. Further, the on-demand code execution system 110 may comprise one or more logical knobs or switches for controlling (e.g., increasing or decreasing) the available capacity in the warming pools 130A. For example, a system administrator may use such a knob or switch to increase the capacity available (e.g., the number of pre-booted instances) in the warming pools 130A during peak hours. In some embodiments, virtual machine instances in the warming pools 130A can be configured based on a predetermined set of configurations independent from a specific call to execute a task. The predetermined set of configurations can correspond to various types of virtual machine instances to execute tasks. The warming pool managers 130 can optimize types and numbers of virtual machine instances in the warming pools 130A based on one or more metrics related to current or previous task executions. Further, the warming pool managers 130 can establish or modify the types and number of virtual machine instances in the warming pools 130A based on pre-trigger notifications (e.g., by pre-initializing one or more virtual machine instances based on requirements of a task expected to be executed based on a received pre-trigger notification).

As shown in FIG. 1, instances may have operating systems (OS) and/or language runtimes loaded thereon. For example, the warming pool 130A managed by a warming pool manager 130 can comprise instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool managers 130 may maintain a list of instances in a corresponding warming pool 130A. The list of instances may further specify the configuration (e.g., OS, runtime, container, etc.) of the instances.

In some embodiments, the virtual machine instances in a warming pool 130A may be used to serve any user's calls. In one embodiment, all the virtual machine instances in a warming pool 130A are configured in the same or substantially similar manner. In another embodiment, the virtual machine instances in a warming pool 130A may be configured differently to suit the needs of different users. For example, the virtual machine instances may have different operating systems, different language runtimes, and/or different libraries loaded thereon. In yet another embodiment, the virtual machine instances in a warming pool 130A may be configured in the same or substantially similar manner (e.g., with the same OS, language runtimes, and/or libraries), but some of those instances may have different container configurations. For example, one instance might have a container created therein for running code written in Python, and another instance might have a container created therein for running code written in Ruby.

The warming pool managers 130 may pre-configure the virtual machine instances in a warming pool 130A, such that each virtual machine instance is configured to satisfy at least one of the operating conditions that may be requested or specified by a user when defining a task. In one embodiment, the operating conditions may include program languages in which the potential user code of a task may be written. For example, such languages may include Java, JavaScript, Python, Ruby, and the like. In some embodiments, the set of languages that the user code of a task may be written in may be limited to a predetermined set (e.g., set of 4 languages, although in some embodiments sets of more or less than four languages are provided) in order to facilitate pre-initialization of the virtual machine instances that can satisfy calls to execute the task. For example, when the user is configuring a task via a user interface provided by the on-demand code execution system 110, the user interface may prompt the user to specify one of the predetermined operating conditions for executing the task. In another example, the service-level agreement (SLA) for utilizing the services provided by the on-demand code execution system 110 may specify a set of conditions (e.g., programming languages, computing resources, etc.) that tasks should satisfy, and the on-demand code execution system 110 may assume that the tasks satisfy the set of conditions in handling the requests. In another example, operating conditions specified by a task may include: the amount of compute power to be used for executing the task; the type of triggering event for a task (e.g., an API call, HTTP packet transmission, detection of a specific data at an auxiliary service 106); the timeout for the task (e.g., threshold time after which an execution of the task may be terminated); and security policies (e.g., may control which instances in the warming pools 130A are usable by which user), among other specified conditions.

One or more worker managers 140 manage the instances used for servicing incoming calls to execute tasks. In the example illustrated in FIG. 1, each worker managers 140 manages an active pool 140A, which is a group (sometimes referred to as a pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's task in a container on a particular instance after another member's task has been executed in another container on the same instance does not pose security risks. Similarly, the worker managers 140 may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution system 110). In some embodiments, the requests associated with the same user group may share the same containers (e.g., if the user codes associated therewith are identical). In some embodiments, a task does not differentiate between the different users of the group and simply indicates the group to which the users associated with the task belong.

As shown in FIG. 1, instances may have operating systems (OS), language runtimes, and containers. The containers may have individual copies of the OS, the runtimes, and user codes corresponding to various tasks loaded thereon. In the example of FIG. 1, the active pools 140A managed by a worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker managers 140 may maintain a list of instances in an active pool 140A. The list of instances may further specify the configuration (e.g., OS, runtime, container, etc.) of the instances. In some embodiments, the worker managers 140 may have access to a list of instances in a warming pool 130A (e.g., including the number and type of instances). In other embodiments, the worker managers 140 requests compute capacity from a warming pool manager 130 without having knowledge of the virtual machine instances in a warming pool 130A.

In the example illustrated in FIG. 1, tasks are executed in isolated on-demand code execution environments referred to as containers (e.g., containers 156D, 156E, 158D). Containers are logical units created within a virtual machine instance using the resources available on that instance. For example, each worker manager 140 may, based on information specified in a call to execute a task, create a new container or locate an existing container in one of the instances in an active pool 140A and assigns the container to the call to handle the execution of the task. In one embodiment, such containers are implemented as Linux containers. Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus, the frontend 120 may pass most or all requests to that worker manager 140. In another embodiment, a frontend 120 may include a location selector 126 configured to determine a worker manager 140 to which to pass the execution request. Illustratively, to assist in implementation of execution guarantees, the location selector 126 to select the same worker manager 140 to receive each call to a task to the same worker manager 140, such that the worker manager 140 can maintain an authoritative execution record for the task. In one embodiment, the location selector 126 may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

On receiving a request to execute a task, a worker manager 140 finds capacity to execute a task on the on-demand code execution system 110. For example, if there exists a particular virtual machine instance in the active pool 140A that has a container with the user code of the task already loaded therein (e.g., code 156D-1 shown in the container 156D), the worker manager 140 may assign the container to the task and cause the task to be executed in the container. Alternatively, if the user code of the task is available in the local cache of one of the virtual machine instances (e.g., codes 158G, 158H, which are stored on the instance 158 but do not belong to any individual containers), the worker manager 140 may create a new container on such an instance, assign the container to the task, and cause the user code of the task to be loaded and executed in the container.

If the worker manager 140 determines that the user code associated with the triggered task is not found on any of the instances (e.g., either in a container or the local cache of an instance) in the active pool 140A, the worker manager 140 may determine whether any of the instances in the active pool 140A is currently assigned to the user associated with the triggered task and has compute capacity to handle the triggered task. If there is such an instance, the worker manager 140 may create a new container on the instance and assign the container to execute the triggered task. Alternatively, the worker manager 140 may further configure an existing container on the instance assigned to the user, and assign the container to the triggered task. For example, the worker manager 140 may determine that the existing container may be used to execute the task if a particular library demanded by the task is loaded thereon. In such a case, the worker manager 140 may load the particular library and the code of the task onto the container and use the container to execute the task.

If the active pool 140 does not contain any instances currently assigned to the user, the worker manager 140 pulls a new virtual machine instance from the warming pool 130A, assigns the instance to the user associated with the triggered task, creates a new container on the instance, assigns the container to the triggered task, and causes the user code of the task to be downloaded and executed on the container.

In some embodiments, the on-demand code execution system 110 is adapted to begin execution of a task shortly after it is received (e.g., by the frontend 120). A time period can be determined as the difference in time between initiating execution of the task (e.g., in a container on a virtual machine instance associated with the user) and detecting an event that triggers execution of the task (e.g., a call received by the frontend 120). The on-demand code execution system 110 is adapted to begin execution of a task within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution system 110 is adapted to begin execution of a task within a time period that is less than a predetermined duration if one or more conditions are satisfied. For example, the one or more conditions may include any one of: (1) the user code of the task is loaded on a container in the active pool 140 at the time the request is received; (2) the user code of the task is stored in the code cache of an instance in the active pool 140 at the time the call to the task is received; (3) the active pool 140A contains an instance assigned to the user associated with the call at the time the call is received; or (4) the warming pool 130A has capacity to handle the task at the time the event triggering execution of the task is detected.

Once the worker manager 140 locates one of the virtual machine instances in the warming pool 130A that can be used to execute a task, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to execute tasks of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the on-demand code execution system 110 may maintain a separate cache in which code of tasks are stored to serve as an intermediate level of caching system between the local cache of the virtual machine instances and the account data store 164 (or other network-based storage not shown in FIG. 1). The various scenarios that the worker manager 140 may encounter in servicing the call are described in greater detail within the '556 patent, incorporated by reference above (e.g., at FIG. 4 of the '556 patent).

After the task has been executed, the worker manager 140 may tear down the container used to execute the task to free up the resources it occupied to be used for other containers in the instance. Alternatively, the worker manager 140 may keep the container running to use it to service additional calls from the same user. For example, if another call associated with the same task that has already been loaded in the container, the call can be assigned to the same container, thereby eliminating the delay associated with creating a new container and loading the code of the task in the container. In some embodiments, the worker manager 140 may tear down the instance in which the container used to execute the task was created. Alternatively, the worker manager 140 may keep the instance running to use it to service additional calls from the same user. The determination of whether to keep the container and/or the instance running after the task is done executing may be based on a threshold time, the type of the user, average task execution volume of the user, and/or other operating conditions. For example, after a threshold time has passed (e.g., 5 minutes, 30 minutes, 1 hour, 24 hours, 30 days, etc.) without any activity (e.g., task execution), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the on-demand code execution system 110 may provide data to one or more of the auxiliary services 106 as it executes tasks in response to triggering events. For example, the frontends 120 may communicate with the monitoring/logging/billing services included within the auxiliary services 106. The monitoring/logging/billing services may include: a monitoring service for managing monitoring information received from the on-demand code execution system 110, such as statuses of containers and instances on the on-demand code execution system 110; a logging service for managing logging information received from the on-demand code execution system 110, such as activities performed by containers and instances on the on-demand code execution system 110; and a billing service for generating billing information associated with executing user code on the on-demand code execution system 110 (e.g., based on the monitoring information and/or the logging information managed by the monitoring service and the logging service). In addition to the system-level activities that may be performed by the monitoring/logging/billing services (e.g., on behalf of the on-demand code execution system 110), the monitoring/logging/billing services may provide application-level services on behalf of the tasks executed on the on-demand code execution system 110. For example, the monitoring/logging/billing services may monitor and/or log various inputs, outputs, or other data and parameters on behalf of the tasks being executed on the on-demand code execution system 110.

In some embodiments, the worker managers 140 may perform health checks on the instances and containers managed by the worker managers 140 (e.g., those in a corresponding active pool 140A). For example, the health checks performed by a worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, a worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, a worker manager 140 may perform similar health checks on the instances and/or containers in a warming pool 130A. The instances and/or the containers in a warming pool 130A may be managed either together with those instances and containers in an active pool 140A or separately. In some embodiments, in the case where the health of the instances and/or the containers in a warming pool 130A is managed separately from an active pool 140A, a warming pool manager 130, instead of a worker manager 140, may perform the health checks described above on the instances and/or the containers in a warming pool 130A.

In the depicted example, virtual machine instances ("instances") 152, 154 are shown in a warming pool 130A managed by a warming pool manager 130, and instances 156, 158 are shown in an active pool 140A managed by a worker manager 140. The illustration of the various components within the on-demand code execution system 110 is logical in nature and one or more of the components can be implemented by a single computing device or multiple computing devices. For example, the instances 152, 154, 156, 158 can be implemented on one or more physical computing devices in different various geographic regions. Similarly, each frontend 120, warming pool manager 130, and worker manager 140 can be implemented across multiple physical computing devices. Alternatively, one or more of a frontend 120, a warming pool manager 130, and a worker manager 140 can be implemented on a single physical computing device. Although four virtual machine instances are shown in the example of FIG. 1, the embodiments described herein are not limited as such, and one skilled in the art will appreciate that the on-demand code execution system 110 may comprise any number of virtual machine instances implemented using any number of physical computing devices. Similarly, although multiple warming pools 130A and active pools 140A are shown in the example of FIG. 1, the embodiments described herein are not limited as such, and one skilled in the art will appreciate that the on-demand code execution system 110 may comprise any number of warming pools and active pools.

In accordance with embodiments of the present disclosure, the on-demand code execution system 110 can function to implement "execution guarantees," whereby the on-demand code execution system 110 can attempt to ensure that, for a given call to execute a task, the task executes only a desired number of times. To enable such guarantees, the on-demand code execution system 110 can maintain an execution record for a given task, in order to determine whether a call to execute the task should be considered valid (e.g., as indicating that the task execute) or invalid (e.g., as duplicative), as well as to determine whether executions of the task are ongoing, have succeeded (thereby helping to satisfy an execution guarantee) or failed (indicating that additional executions are required to satisfy an execution guarantee). Such execution records can be stored and maintained by an execution control service 160, including an execution controller 162 and an execution record data store 160. As described in more detail below, the execution controller 162 may enable other components of the on-demand code execution system 110, such as worker managers 140 to obtain or verify information within an execution record for a task, to determine whether a current request to execute the task is valid. Such execution records can be stored within the execution record data store 164, which may correspond to any persistent or substantially persistent data storage, such as a hard drive (HDD), a solid state drive (SDD), network attached storage (NAS), a tape drive, or any combination thereof. In one embodiment, a number of frontends 120 and/or worker managers 140 may share access to a common execution control service 160, which may maintain execution records for all or a large proportion of tasks on the on-demand code execution system 110. In another embodiment, each frontend 120 and/or worker manager 140 may be associated with a different execution control service 160, and the respective frontend 120 or worker manager 140 may utilize their respective execution control services 160 to record data regarding executions occurring via the frontend 120 or worker manager 140. The use of different execution control services 160 for each frontend 120 or worker manager 140 may reduce the complexity or delays caused, for example, by multiple frontends 120 or worker managers 140 sharing access to an execution control service 160. To reduce the risk that different execution records for a given task are stored in different execution record data stores 164, the frontends 120 and/or worker managers 140 may be configured to distribute a given task (or a given combination of task and parameters) to the same worker manager 140 in all (or nearly all) instances, such that that same execution control service 160 maintains an "authoritative" execution record for the task. In the instance that a different worker manager 140 obtains a call to execute the task (e.g., due to load balancing), the worker manger 140 may query another execution control service 160 that maintains an authoritative execution record for the task, and utilize that execution record to implement execution guarantees.

In some instances, execution guarantees may be implemented by use of execution identifiers, which designate a call to execute a task as distinct from other calls, and indicate that a new execution guarantee should be implemented for the call. In one embodiment, execution identifiers may be embedded into a call by a calling device (e.g., by execution of a function within code that generates the call, by manual specification within the parameters of the call, etc.). Execution identifiers, for example, may be globally unique identifiers (GUIDs), or identifiers that are unique for a given aspect of a call (e.g., task, calling account, parameters for the task, etc.). The on-demand code execution system 110, on obtaining a call to execute a task, can function by determining that all calls sharing an execution identifier should be handled according to the same execution guarantee, such that multiple calls to execute the function that share an execution identifier are considered redundant. In the instance that a call does not include an execution identifier, the on-demand code execution system 110 may in some instances assign such an identifier, or may process the call without implementation of an execution guarantee.

Thereafter, the on-demand code execution system 110 (e.g., via the worker manager 140) can function to execute the task a desired number of times. This desired number of times may be specified, for example, by a user when creating a task or within the call to execute the task itself. Prior to allocating computing resources for executing the task, the worker manger 140 can query the execution control service 160 to ensure that a combined number of prior successful executions and ongoing executions for the execution identifier do not meet or exceed the desired number of executions for that execution identifier. If the number of prior successful executions and ongoing executions for the execution identifier do meet or exceed the desired number of executions for that execution identifier, the worker manager 140 may treat the call to execute the task as redundant, and decline to allocate computing resources for execution of the task. In the instance that the number of prior successful executions and ongoing executions for the execution identifier do not meet or exceed the desired number of executions for that execution identifier, the worker manager 140 can allocate computing resources to execute the task (e.g., by generating or allocating resources of an execution environment in which to execute the task). The worker manager 140 (or the execution environment itself) can then record with the execution control service 160 that execution has started for the corresponding execution identifier. On successful execution of the task (e.g., as designated by execution of the task finishing without error or exception, or by the execution of a function or setting of a variable within code of the task), the worker manager 140 (or the execution environment itself) may record with the execution control service 160 that execution has succeeded for the corresponding execution identifier. In the instance that execution fails (e.g., the execution halts with an exception or error, or the execution fails to call a success function or set a success variable), the worker manager 140 (or the execution environment itself) may record with the execution control service 160 that execution has failed for the corresponding execution identifier, and request that an additional execution occur. Moreover, the worker manager 140 (or the execution environment itself) may execute code (e.g., as specified within the task itself) to rollback or undo the failed execution.

As will be described below, in some instances the on-demand code execution system 110 may enable users to create "multi-part" or multi-stage tasks, such that a task may succeed with respect to some operations while still failing with respect to other operations, and such that subsequent executions of the task can resume at an earliest failed operation of a prior failed execution. In such instances, code for a task may provide separate functions or variables to indicate success with respect to any given stage, and the state information for each stage may be record in the execution record. Similarly, rollback or undo operations may occur at a stage-by-stage basis, and subsequent executions can decline to implement previously-succeeded operations. In some instances, stage information may be utilized to determine whether a request should be considered valid. For example, the on-demand code execution system 110 may decline to process any "out of order" requests (e.g., with a state identifier that is not subsequent to a prior valid stage identifier).

While some functionalities are generally described herein with reference to an individual component of the on-demand code execution system 110, other components or a combination of components may additionally or alternatively implement such functionalities. For example, while a worker manager 140 may operate to record the state of executions for a given execution identifier, a frontend 140 or virtual machine instance may additionally or alternatively record such state information.

Figure 2:
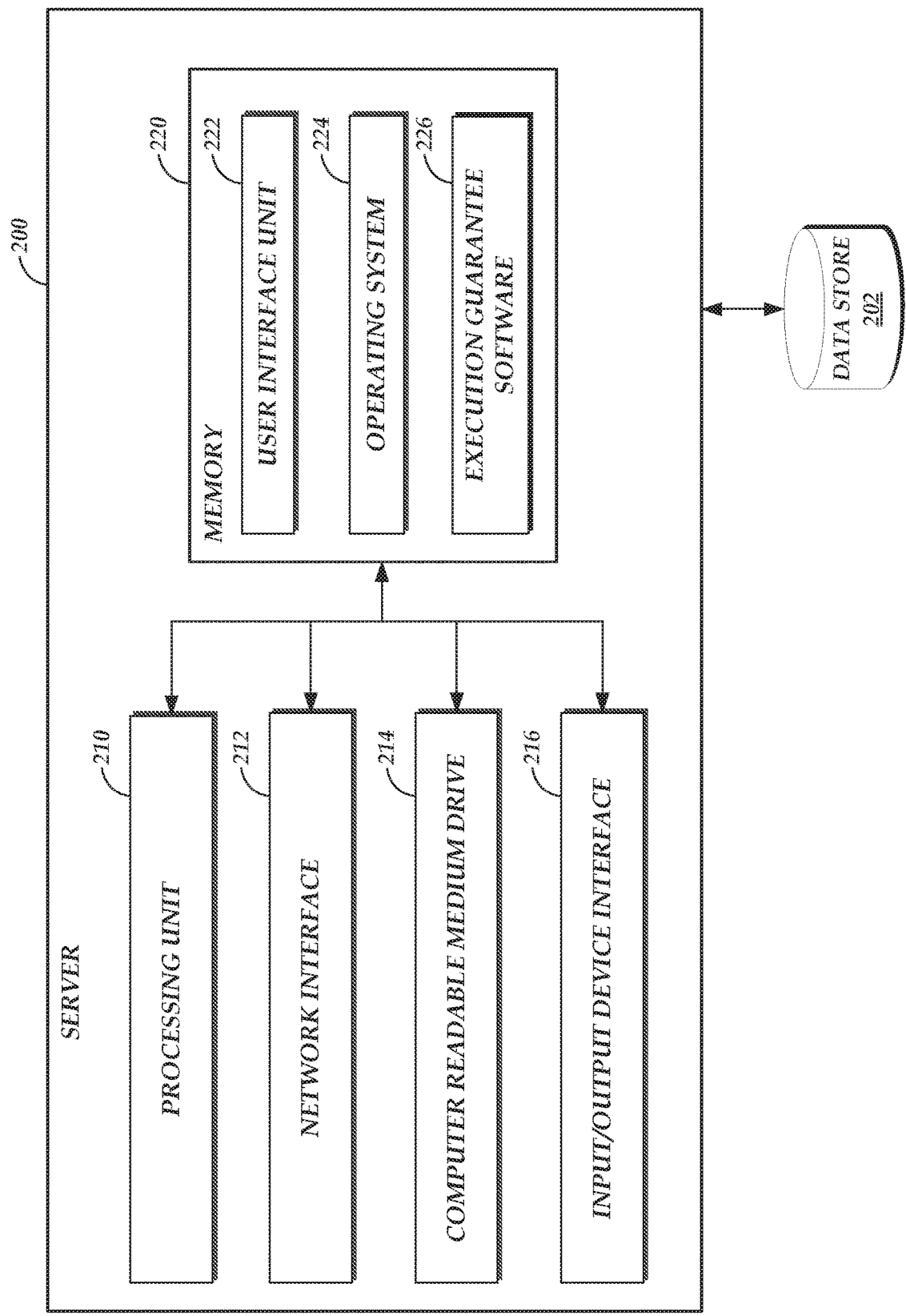
FIG. 2 depicts a general architecture of a computing device providing a worker manager 140 of FIG. 1.

FIG. 2 depicts a general architecture of a computing system (referenced as server 200) that implements embodiments of the present disclosure to enable execution guarantees on the on-demand code execution system 110. Illustratively, the server 200 may operate to implement the execution controller 162 of FIG. 1. The general architecture of the server 200 depicted in FIG. 2 includes an arrangement of computer hardware and software modules that may be used to implement aspects of the present disclosure. The hardware modules may be implemented with physical electronic devices, as discussed in greater detail below. The server 200 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the server 200 includes a processing unit 210, a network interface 212, a computer readable medium drive 214, and an input/output device interface 216, all of which may communicate with one another by way of a communication bus. The network interface 212 may provide connectivity to one or more networks or computing systems. The processing unit 210 may thus receive information and instructions from other computing systems or services via the network 104. The processing unit 210 may also communicate to and from memory 220 and further provide output information for an optional display (not shown) via the input/output device interface 216. The input/output device interface 216 may also accept input from an optional input device (not shown).

The memory 220 may contain computer program instructions (grouped as modules in some embodiments) that the processing unit 210 executes in order to implement one or more aspects of the present disclosure. The memory 210 generally includes random access memory (RAM), read only memory (ROM) and/or other persistent, auxiliary or non-transitory computer readable media. The memory 210 may store an operating system 224 that provides computer program instructions for use by the processing unit 210 in the general administration and operation of the server 200. The memory 220 may further include computer program instructions and other information for implementing aspects of the present disclosure. For example, in one embodiment, the memory 220 includes a user interface unit 222 that generates user interfaces (and/or instructions therefor) for display upon a computing device, e.g., via a navigation and/or browsing interface such as a browser or application installed on the computing device. In addition, the memory 220 may include and/or communicate with one or more data repositories, such as the data store 202, which may correspond to any persistent or substantially persistent data storage, such as a hard drive (HDD), a solid state drive (SDD), network attached storage (NAS), a tape drive, or any combination thereof.

In addition to and/or in combination with the user interface unit 222, the memory 220 may include execution guarantee software 226. In one embodiment, the user interface unit 222 and the execution guarantee software 226 individually or collectively implement various aspects of the present disclosure, e.g., managing execution records to implement execution guarantees, etc. as described further below.

Illustratively, the execution guarantee software 226 may include instructions that, when executed by the server 200, cause the server to obtain a notification of a call to execute a task, retrieve an execution record for the task by an execution identifier within the call, and verify that the call is valid (e.g., not duplicative). The execution guarantee software 226 may further interact with an execution record (e.g., as stored within the data store 202, which may implement an execution record data store 164 of FIG. 1) to record the state of an execution as it begins and ends either successfully or with errors, and to instruct or interact with worker managers 140 to handle executes that end in errors by rolling back or undoing the execution and causing an additional execution to begin.

While the execution guarantee software 226 is shown in FIG. 2 as part of a server 200 implementing an execution controller 162, in other embodiments, all or a portion of the execution guarantee software 226 may be implemented by other components of the on-demand code execution system 110 and/or another computing device, such as a worker manager 140.

In some embodiments, the server 200 may further include components other than those illustrated in FIG. 2. For example, the memory 180 may further include a container manager for managing creation, preparation, and configuration of containers within virtual machine instances.

Figure 3A:
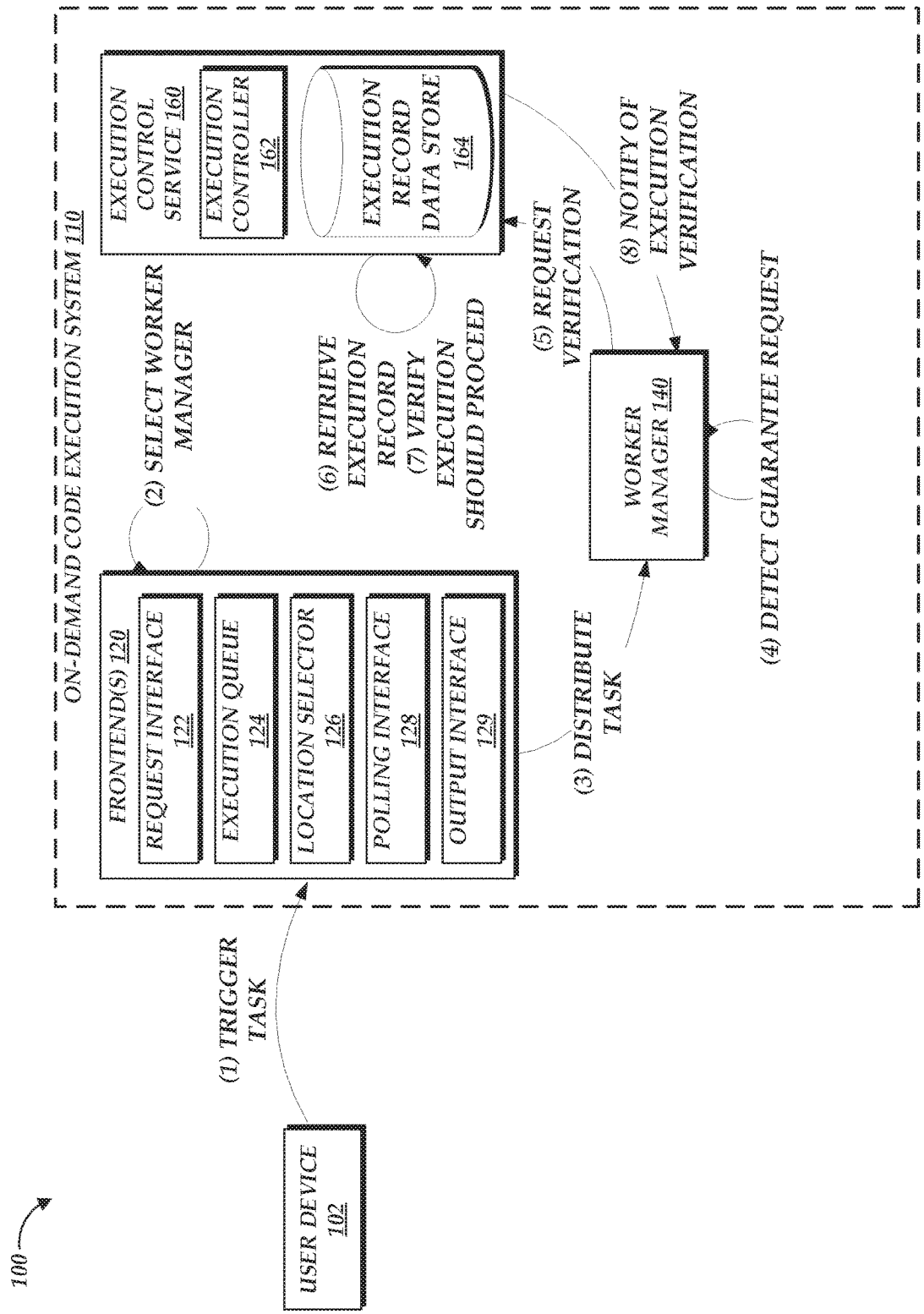
FIGS. 3A-3C are flow diagrams depicting illustrative interactions for managing task executions according to the execution guarantee protocols of the present disclosure.
Figure 3B:
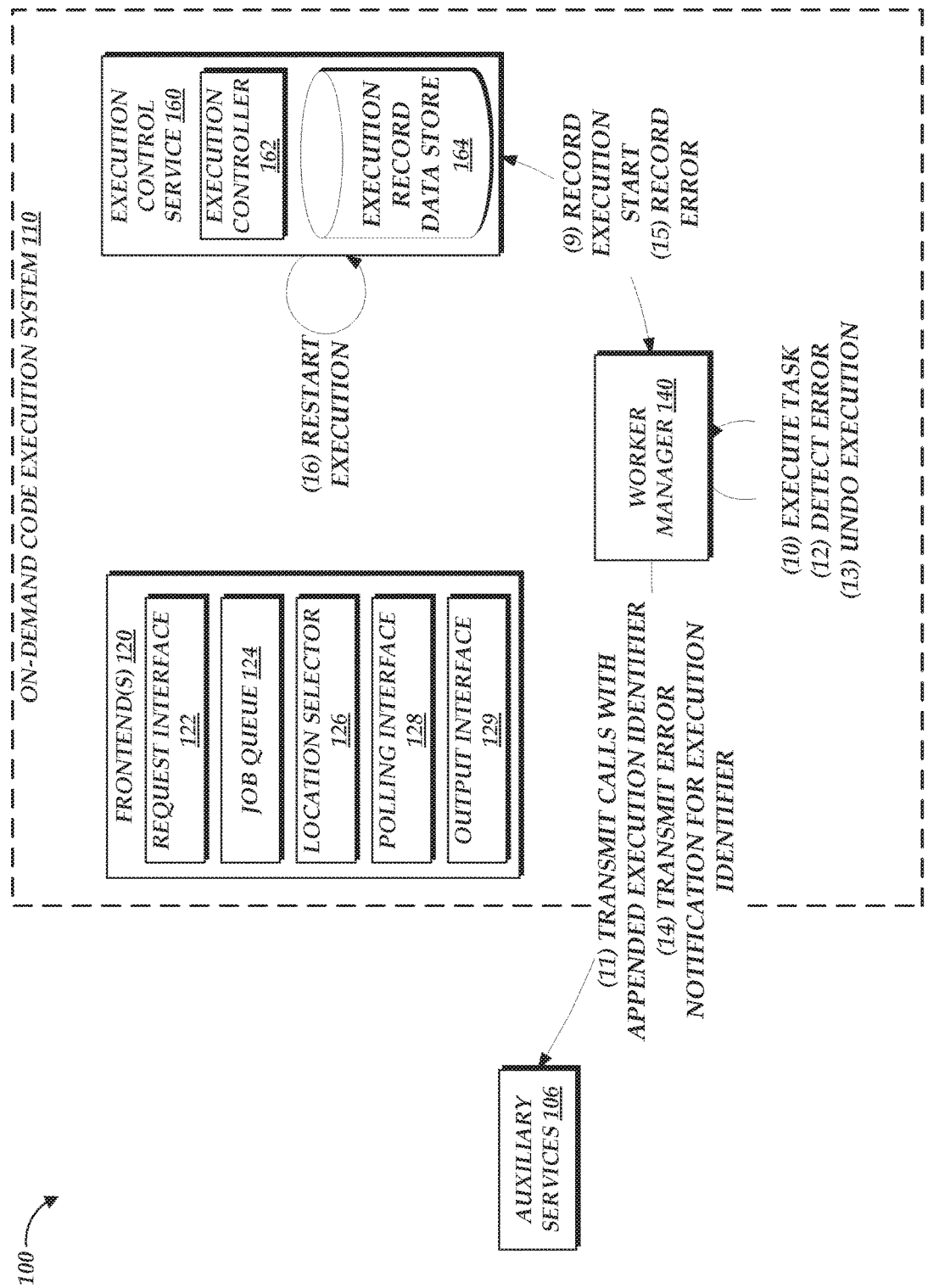
Figure 3C:
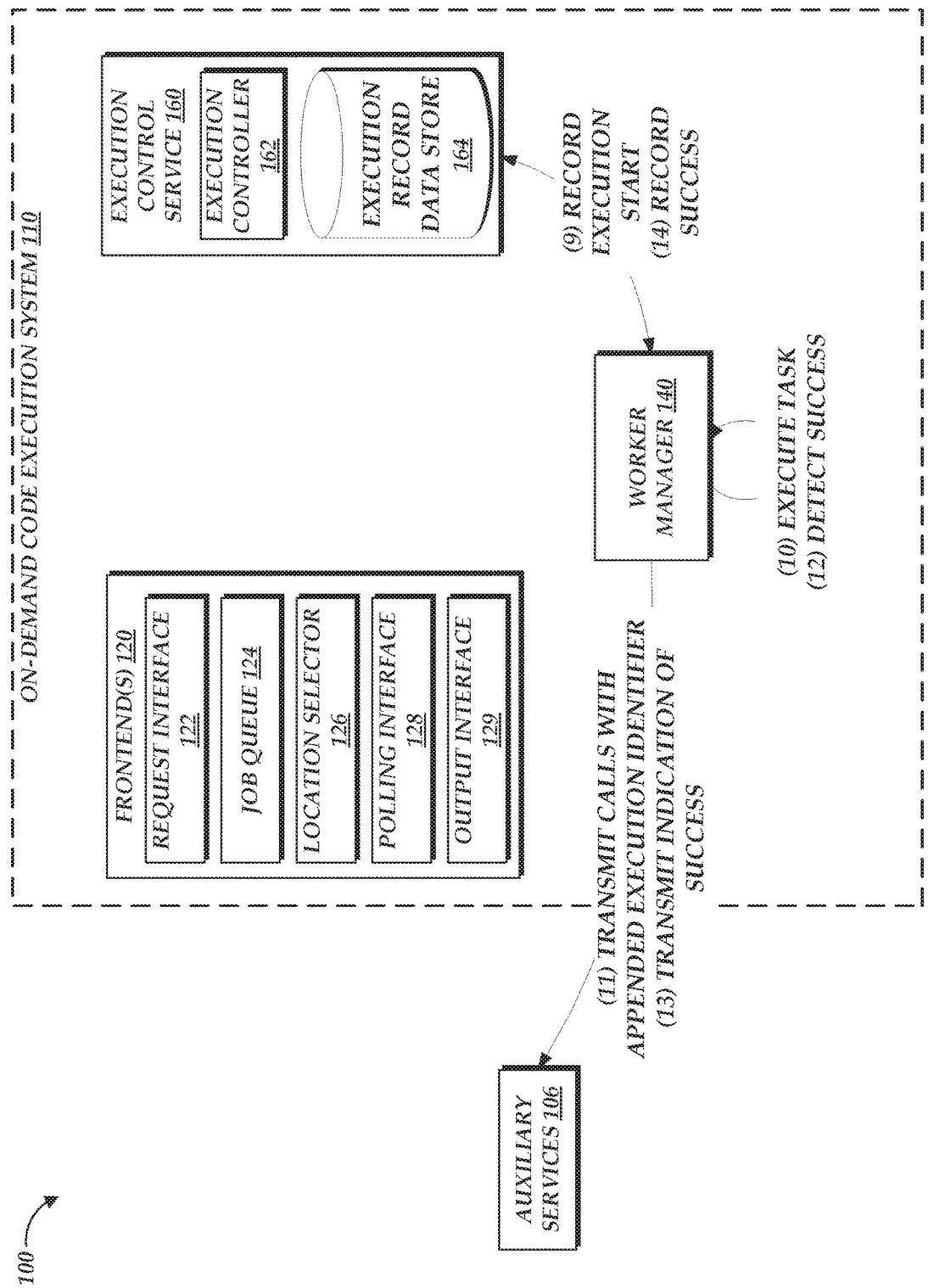

With reference to FIGS. 3A through 3B, illustrative interactions are depicted for implementing execution guarantees in the on-demand code execution system 110, by maintaining an execution record for each associated execution, detecting the success or error of an execution, and rolling back or undoing erroneous executions. Specifically, FIG. 3A depicts interactions for calling for execution of a task under an execution guarantee, while FIGS. 3B and 3C depict illustrative interactions for handling erroneous or successful executions, respectively. While shown in three figures, the numbering of interactions in FIGS. 3A through 3C is maintained for clarity. Because FIGS. 3B and 3C represent alternative interactions, numbering between these figures may overlap.

The interactions of FIG. 3A begin at (1), where a user device 102 submits to a frontend 120 a call to a task on the on-demand code execution environment. As noted above, submission of a call may include transmission of specialized data to the frontend 120, such as a HTTP packet or API call referencing the task alias. While the interactions of FIG. 3A are described as including an explicit call to the task by the user device 102, calls to the task may occur in a variety of manners, including submission of a call by auxiliary services 106 (not shown in FIG. 3A) or generation of a call by the on-demand code execution system 110 (e.g., based on a rule to call the alias when specific criteria are met, such as elapsing of a period of time or detection of data on an auxiliary service 106). The call may include any information required to execute the task, such as parameters for execution, authentication information under which to execute the task or to be used during execution of the task, etc. In addition, the call may include an execution identifier, used to distinguish between duplicative calls and distinct calls to execute a task. The execution identifier may, for example, be passed as a parameter within the call.

Thereafter, at (2), the frontend 120 selects a worker manager 140 to execute the task in response to the call. In one embodiment, the worker manager 140 may be selected as a function of the task, the call, the execution identifier, or a combination thereof, such that the same task, call, or execution identifier is always or nearly always (e.g., subject to computational restraints) passed to the same worker manager 140. In other instances, the frontend 120 may select the same worker manager 140 to process each task, or may select between worker managers 140 according to other criteria, such as load balancing criteria.

After selecting a worker manager 140, the frontend 120 distributes the task for execution by the worker manager 140, at (3). While not shown in FIG. 3A, in some instances the frontend 120 may perform additional operations prior to distributing the task to the worker manager 140, such as determining whether sufficient capacity exists to execute the task, queuing the task, determining accounts to which to attribute execution of the task, etc. Such operations are described in more detail in the '556 patent. In some instances, the frontend 120 may implement functionalities described below with reference to the worker manager 140, such as requesting verification from the execution control service 160 that the call is valid, based on an execution record for the task, After receiving distribution of the task, the worker manager 140, at (4), detects that the task should be executed according to an execution guarantee. In one embodiment, such detection may include determining than an execution identifier is associated with the call to execute the task (e.g., as a parameter of the task) or may include determining that an owner of the task has requested that the task execute with an execution guarantee.

At (5), the worker manager 140 transmits a request to the execution control service 160 to verify that the task is valid, based on an execution record for the task. Thereafter, at (6), the execution control service 160 utilizes the execution identifier to obtain a corresponding execution record from the execution record data store 164, which can indicate whether other executions corresponding to the execution identifier are underway or have completed successfully. At (7), the execution control service 160 inspects the execution record to verify that execution of the task is valid and should proceed. Illustratively, the execution control service 160 may determine that execution should proceed so long as the total number of ongoing executions, combined with the total number of successful executions, for a given execution identifier do not meet or exceed the desired number of executions for that execution identifier (e.g., as specified within the call to the task, within preferences for the task, etc.). At (8), the execution control service 160 returns a result of the verification to the worker manager 140, indicating whether the request to execute the task is valid and whether execution should proceed. As noted above, by verifying whether execution should proceed prior to allocating computing resources for execution of a task, the worker manager 140 can reduce the computing resources required to handle duplicative calls for execution. This provides an advantage over in-code de-duplication, since such in-code techniques require allocation of computing resources on the on-demand code execution environment in which to execute the code for the in-code technique.

While an illustrative ordering of interactions is shown in FIG. 3A, these interactions may vary according to different embodiments of the present disclosure. For example, rather than retrieving an execution record for the task from the execution record data store 164, the execution control service 160 in some instances may query the data store 164 (e.g., via a structured query language) to verify that the that execution of the task should proceed, and the data store 164 may respond to such query with sufficient information to verify that the execution should proceed, without requiring the complete execution record to be retrieved by the execution control service 160. In other embodiments, the worker manager 140 may function to verify that an execution should proceed based on a corresponding execution record. For example, the worker manager 140 may directly interact with the execution record data store 164 to obtain an execution record for a task, or to query the data store 164 for information indicating whether the current request to execute the task is valid.

The interactions of FIG. 3A are continued on FIGS. 3B and 3C, which depict alternative interactions for instances in which an execution of a task is erroneous or successful, respectively. Specifically, with reference to FIG. 3B, the interactions continue at (9), where the worker manager 140 interacts with the execution control service 160 to record the start of an execution of the task within the execution record for the task. At (10), the worker manager 140 initiates execution of the task. While not shown in FIG. 3B, the worker manager 140 may undertake a number of operations to execute the task, such as locating or creating an appropriate execution environment in which to execute the task, distributing the task to the execution environment for execution, etc. These operations are described in more detail above and within the '556 patent.

To facilitate proper handling of erroneous executions, the worker manager 140 may be configured to include an execution identifier within any calls made during that task execution, as shown in interaction (11). For example, where a task execution calls a "put" operation to a network-accessible database, the execution identifier for the task may be included within the put operation. As will be described below, this may enable the database or other network-accessible service to implement rollbacks for erroneous executions, even when the relevant errors do not occur on the database or network-accessible service. As a further example, where a task execution calls another task on the on-demand code execution system 110, an execution identifier may be included within the call. In some instances, different execution identifiers may be included in calls made from a task execution, which may, for example, enable recursive calls to operate without being discarded as duplicative. In other instances, the same execution identifier may be propagated throughout any calls made from a task execution. Where the same execution identifier is propagated throughout any calls, additional metadata may be included within the call, such as an identifier for a task from which the call occurred or an iteration number for the call, to enable the called system to distinguish between distinct and duplicative calls. Various systems and methods for including such additional metadata within calls are described within U.S. patent application Ser. No. 14/971,882, entitled "PREDICTIVE MANAGEMENT OF ON-DEMAND CODE EXECUTION" and filed Dec. 16, 2016 (the "'882 application"), the entirety of which is hereby incorporated by reference.

At (12), the worker manager 140 can detect an error with the task execution. Illustratively, detection of an error may include detection of an exception "thrown" by a task execution, or the task execution otherwise halting in an unhandled or erroneous way. Detection of an error may further include detecting that an execution environment for the task execution has become "unhealthy," such as by becoming unresponsive, by consuming excess computing resources, or by operating for over a threshold period of time.

When such an error is detected, the worker manager 140 can undo effects of the erroneous task execution, as shown at (13). In one embodiment, executable code for undoing or rolling back an erroneous execution can be specified by the creator of a task, either within the code of the task itself or as a corresponding task on the on-demand code execution environment. Thus, the worker manager 140 can undo the effects of an erroneous execution by executing that "undo" code. Further, the worker manager 140 can undertake operations that attempt to rollback or undo any effects of the erroneous task execution, such that the task can be executed again in an attempt to satisfy the execution guarantee. These operations may include, for example, transmitting an error notification for any calls made during the task execution, such that the effect of those calls can be undone, as shown at (14). Illustratively, for any calls made during the task execution, the worker manager 140 may transmit a corresponding call to the destination service indicating that the task execution resulted in an error, thus enabling effects of the prior call to be rolled back or undone by the destination service. In one embodiment, the calls indicating erroneous execution may be generated within an "undo" function of the task itself. In another embodiment, the calls indicating erroneous execution may be generated by the worker manager 140 independent of the task execution, or by executing a corresponding task (e.g., an "undo" task) on the on-demand code execution system 110.

In some embodiments, the worker manager 140 may utilize "saved states" or "snapshots" of virtual devices within the on-demand code execution system 110 to undo the effects of an execution. For example, where the task is executing in a virtual machine instance, the worker manager 140 may save a "snapshot" (a record of the virtual machines state, including disk state, memory state, configuration, etc.) of the virtual machine instance as a state of the task. Similarly, where the task is executing in a container (either inside or outside a virtual machine instance), the worker manager 140 may "commit" the container, to save a current state of the container as an image. An additional mechanism that can be used to save the state of a task may be to save a state of runtime environment execute the task. For example, the worker manager 140 may save the state of a node.js or Java virtual machine environment executing the task. A further mechanism to save the state of the task may be to save the state of objects within the task (e.g., variables, static objects, etc.). In some instances, saving the state of objects may be accomplished by a compiler or interpreter that servers to prepare the code of the task for execution. In other instances, saving the state of objects may be accomplished by the virtual machine itself. For example, if the task has not yet started processing (e.g., if blocking occurs very early in the task), the parameters input to the task may serve to save the state of the task. Conversely, if the task has nearly completed processing, the parameters output from the task may serve to save the state of the task. Third party tools may also be used to inspect the memory of the execution environment in order to save a state (sometimes referred to as a "checkpoint") of the task. Any such mechanism may be used to save a state of an execution environment prior to execution of the task. Thereafter, the effects of execution of the task on that execution environment can be undone or rolled back by reverting to the previously stored state.

While interactions (13) and (14) are described separately in FIG. 3B for clarity, these actions may occur simultaneously or concurrently. For example, the worker manager 140 (or a virtual machine under the control of the worker manager 140) may undo the effects of a task execution by calling an undo function with the code of the task or within code of a corresponding task, and such code may cause the worker manager 140 (or a virtual machine under the control of the worker manager 140) to undertake interactions (13) and (14).

Additionally, at (15), the worker manager 140 can record, with the execution control service 160, that the task execution resulted in an error. This may prevent subsequent executions from being dismissed as duplicative or invalid. In some instances, the execution control service 160 can be configured to respond to errors by restarting execution of the task, as shown in (14), in order to attempt to execute the task the desired number of times. Illustratively, restarting execution of the task may include generation, at the execution control service 160, of a new call to execution the task, which may be transmitted to the frontend 120, potentially enabling distribution of the task to a different worker manager 140 (e.g., to reduce the possibility that the execution environment of the prior execution caused an error, to assist in load balancing, etc.). In another embodiment, restarting execution of the task may include distribution of the task directly from the execution control service 160, either to the same worker manager 140 or a different worker manager 140. Thus, while the phrase "restarting" is used herein, this term is not intended to imply that a new, restarted execution is the same execution that previously failed. Instead, the restarted execution may include the generation of a new call to execute the previously failed task. In some instances, the execution control service 160 may be configured to restart a task only when a subsequent execution of the task is not expected to result in an error. For example, the execution control service 160 may decline to restart a task when prior executions of the task (e.g., over a given period of time) have resulted in an error at least a threshold amount of times (e.g., as a percentage of total executions or absolute amount). As another example, the execution control service 160 may decline to restart a task when an error during a prior execution is of a type expected to occur repeatedly (e.g., an error in code of the task itself).

As an alternative to the depictions of FIG. 3B, the interactions of FIG. 3A may continue as depicted in FIG. 3C, where a task execution completes successfully. Specifically, with reference to FIG. 3C, the interactions continue at (9), where the worker manager 140 records with the execution control service 160 that the task execution has begun. At (10), the worker manager begins to execute the task. Similarly to as noted with respect to FIG. 3B, while not shown in FIG. 3C, the worker manager 140 may undertake a number of operations to execute the task, such as locating or creating an appropriate execution environment in which to execute the task, distributing the task to the execution environment for execution, etc. These operations are described in more detail above and within the '556 patent.

In addition, as noted with respect to FIG. 3B, the worker manager 140 may be configured to include an execution identifier within any calls made during that task execution, as shown in interaction (11), which may facilitate proper handling of erroneous executions (should they occur). In some instances, different execution identifiers may be included in calls made from a task execution, which may, for example, enable recursive calls to operate without being discarded as duplicative. In other instances, the same execution identifier may be propagated throughout any calls made from a task execution. Where the same execution identifier is propagated throughout any calls, additional metadata may be included within the call, such as an identifier for a task from which the call occurred or an iteration number for the call, to enable the called system to distinguish between distinct and duplicative calls. Various systems and methods for including such additional metadata within calls are described within the '882 application, incorporated by reference above.

At (12), the worker manager 140 can detect that the task completed successfully. In one embodiment, such detection may include calling a function during execution of the task (e.g., a "success" function), or setting a variable during the task execution. In another embodiment, such detection may include detecting that the task completed without error or exception. To ensure consistency among auxiliary services 106 called during execution of the task, the worker manager 140 can transmit, at (13), an indication of the successful execution to those auxiliary services 106. Thereafter, at (14), the worker manager 140 can record, with the execution control service 160, that the execution completed successfully.

One of skill in the art will appreciate that the interactions of FIG. 3A through 3C may include additional or alternative interactions to those described above. For example, in some instances, a worker manager 140 may be configured, on detecting successful execution of a task, to determine whether any additional executions are needed to fulfill an execution guarantee, and if so, to begin an additional execution. In other instances, this functionality may be handled by other components of the on-demand code execution system 110, such as the execution control service 160 or the frontend 120, or may be implemented directly within the code of the task (e.g., via recursive calls to execute the task). Moreover, while some functions are described with reference to specific components, such as the execution control service 160, the worker manager 140, or the frontend 120, other components of the on-demand code execution system 110 may alternatively undertake these functions. Still further, while embodiments are generally described with respect to single-part or single-stage functions, embodiments of the present disclosure may enable execution guarantees to be implemented with respect to multi-part or multi-stage functions. Illustratively, where a task undertakes three operations, each operation may be assigned a different execution identifier (which may be a combination of the initial execution identifier for the task and a sub-identifier), and the worker manager 140 may record and manage the state of each operation independently. In this manner, if one part of a multi-part task fails, execution could be restarted with respect to that part, rather than restarting the entire task. In some instances, different operations of a multi-state execution may be utilized to determine whether a call to execute a task is valid. For example, the on-demand code execution system 110 may decline to process "out-of-order" requests, where an execution identifier within a call does not correspond to a stage immediately subsequent to a previously completed stage. As another example, the on-demand code execution system 110 may decline to process stages prior to a latest-executed stage (e.g., such that execution of a stage prevents subsequent execution of prior stages, while still allowing execution of any later stages regardless of ordering of those later stages). Thus, the interactions of FIGS. 3A-3C should be viewed as illustrative in nature.

In some instances, the interactions of FIGS. 3A-3C may be modified or supplemented to account for additional failure scenarios, such as a scenario where a task begins execution but neither successfully completes nor results in a detected error. Such a scenario may occur, for example, where a task execution "hangs," or where a worker manager 140 experiences an error that prevents a final state of the task execution being recorded at the execution control service 160. To address such scenarios, the execution control service 160 can implement a "garbage collection" procedure, which inspects the execution record data store 164 of execution records that indicate a task has begun executing, with no corresponding record of successful or erroneous execution after a threshold period of time (e.g., 10 seconds, 1 minute, 10 minutes, etc.). Illustratively, the execution control service 160 may be configured to query a worker manager 140 for the state of such tasks, to verify the task as executing, completed successfully, or failed. The execution control service 160 may then update the execution record accordingly. In the event that execution control service 160 does not or cannot obtain a state from a worker manager 140 (e.g., if the worker manager 140 itself has failed), the execution control service 160 may consider the task execution failed, and take appropriate action (e.g., updating an execution record, restarting the task execution etc.). Illustratively, this garbage collection routine may be implemented periodically or continuously by the execution control service 160. Thus, the execution control service 160 can be configured to ensure that the execution records within the execution record data store 164 remain current. The execution control service 160 may implement functionalities in addition to those described with reference to FIGS. 3A-3C. For example, in some instances, the execution control service 160 may provide interfaces (e.g., application programming interfaces, or "APIs") through which client computing devices 102 may obtain execution records for tasks, or request a current status of a task execution.

Figure 4:
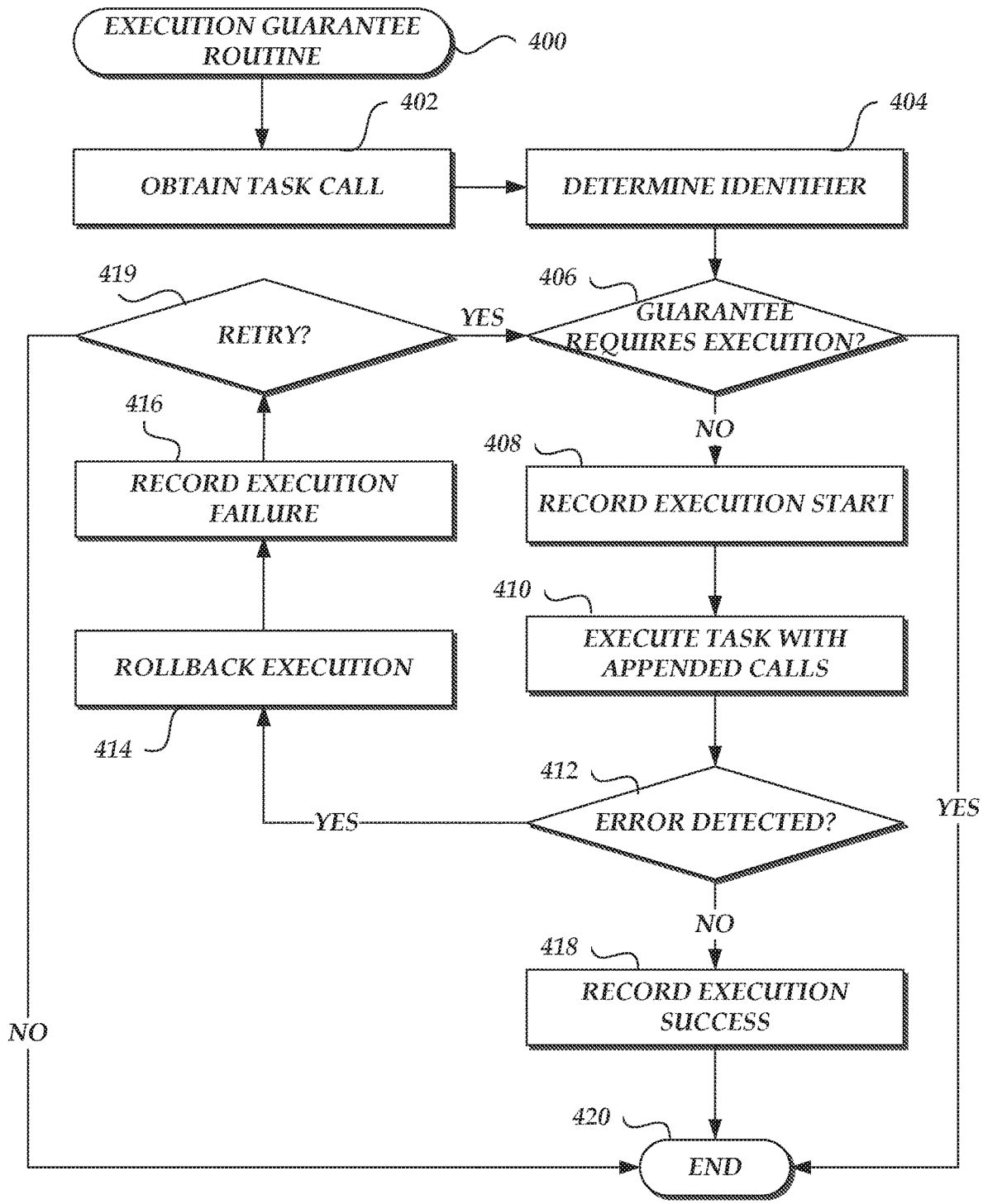
FIG. 4 is a flow chart depicting an illustrative routine for implementing execution guarantees.

With reference to FIG. 4, a block diagram depicting an illustrative routine 400 for implementing execution guarantees on the on-demand code execution system 110 will be described. The routine 400 begins at block 402, where the on-demand code execution system 110 (e.g., via a frontend 120) receives a call to execute a task subject to an execution guarantee (e.g., as specified within the call, within preferences for the task, etc.). At block 304, the on-demand code execution system 110 (e.g., via a worker manager 140) determines an execution identifier for the task, which may be included in the task call, used to differentiate distinct calls to execute the task from duplicative calls.

At block 406, the on-demand code execution system 110 determines whether the execution guarantee for the task requires that the task be executed. Illustratively, implementation of block 406 may include obtaining an execution record for the task (or the execution identifier for the task call), and determining whether prior executions do or do not the execution guarantee. If the execution guarantee does not require that the task be executed—for example, if the received call is duplicative of another call, and the task is already executing or has been executed—the routine 400 proceeds to block 420, where it ends. However, if the execution guarantee does require that the task be executed, the routine 400 continues to block 408, where the on-demand code execution system 110 records (e.g., within an execution record) that execution of the task will begin, and to block 410, where the task is executed. Illustratively, execution of the task may include selection or creation of an execution environment, such as a virtual machine instance or container, for the task execution. Execution of the task may further include appending calls made during execution of the task with an execution identifier (potentially but not necessarily matching the execution identifier of the task) usable to rollback or undo the effects of those calls.

The routine 400 then continues to block 412, where the on-demand code execution system 110 determines whether an error has been detected during execution of the task, such as by detecting that the task quit unexpectedly or generated exceptions, by detecting that a state of the task or an execution environment of the task has become unhealthy, or by detecting that an execution record for the task indicates that a task has begun, but does not indicate that the task succeed or failed after a threshold period of time. If so, the routine 400 continues to block 414, where the on-demand code execution system 110 rolls back the effects of the execution, such as by reverting a state of the execution environment or calling an undo function within code of the task or other associated code. In some instances, implementation of block 414 may include generating, for any calls made during the erroneous execution, corresponding calls with a matching execution identifier that indicate that the execution was erroneous, such that the effects of those calls may also be rolled back. The routine 400 then continues to block 416, where the execution is recorded as having failed, and then to block 419, where the on-demand code execution system 110 determines whether the task should be restarted. As described above, the on-demand code execution system 110 may attempt to restart a task, so long as restarting of the task is not expected to result in a subsequent error (e.g., as determined based on a type of a prior error, a number or frequency of prior errors, etc.). If the on-demand code execution system 110 determines that the task should be restarted, the routine 400 continues to block 406, as described above. Otherwise, the routine 400 ends at block 420.

Returning to the description of block 412, in the instance that no error has been detected during execution of the task, or in the instance that a success function or variable is successfully called or set by the task execution, the routine 400 continues to block 418, where the on-demand code execution system 110 records (e.g., within an execution record) that the task has completed successfully. The routine 400 then ends at block 420.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a non-transitory data store configured to store an execution record of a task, wherein the task is associated with code executable to implement functionality corresponding to the task, and wherein executing the task comprises executing the code; and
   one or more processors configured with computer-executable instructions to:
      obtain, from one or more devices external to the system, first instructions instructing the system to execute the task, wherein the task is associated with a request to implement an execution guarantee for the task, wherein the execution guarantee specifies that the task is to be successfully executed on an on-demand code execution system no more than a desired number of times for instructions including a first execution identifier, wherein the execution guarantee is not implemented for instructions not including the first execution identifier, and wherein the first instructions include the first execution identifier;
      obtain an execution record corresponding to the first execution identifier, wherein the execution record indicates whether other executions of the task, associated with the first execution identifier, have successfully occurred or are occurring;
      verify, from at least the execution record, that a number of the other executions of the task that are associated with the first execution identifier and that have successfully occurred or are occurring is less than the desired number of times associated with the first execution identifier; and
      in response to verifying that the number of the other executions of the task that are associated with the first execution identifier and that have successfully occurred or are occurring is less than the desired number of times associated with the first execution identifier, respond to the first instructions at least by:
         generating an execution environment on the on-demand code execution system in which to execute the task;
         initiating an execution of the task on the on-demand code execution system within the execution environment; and
         recording a state of execution of the task within the execution record;
      obtain, from the one or more devices external to the system, second instructions instructing the system to execute the task, the second instructions including the first execution identifier associated with the request to verify that, for instructions including the first execution identifier, the task is successfully executed on the on-demand code execution system no more than the desired number of times; and
      respond to the second instructions to execute the task at least by:
         verifying, from at least the execution record, that the number of the other executions of the task that are associated with the first execution identifier and that have successfully occurred or are occurring, including the execution initiated in response to the first instructions, is not less than the desired number of times associated with the first execution identifier; and
         declining to execute the task on the on-demand code execution system; and
      obtain, from the one or more devices external to the system, third instructions instructing the system to execute the task, the third instructions not including the first execution identifier associated with the request, and in response to the third instructions not including the first execution identifier, initiate an additional execution of the task on the on-demand code execution system without implementing the execution guarantee.

2. The system of claim 1, wherein the execution environment is at least one of a virtual machine instance or a container.

3. The system of claim 1, wherein the one or more processors are further configured with the computer-executable instructions to:
   determine that the state of execution of the task within the execution record indicates an error;
   rollback the execution of the task; and
   initiate a second execution of the task.

4. The system of claim 1, wherein the one or more processors are further configured with the computer-executable instructions to:
 determine that the state of execution of the task does not indicate either success or failure after at least a threshold period of time; and
 record that the state of execution of the task is erroneous.

5. A method implemented by a computing system to manage code execution in an on-demand code execution system, the computer-implemented method comprising:
 obtaining, from one or more devices external to the computing system, first instructions instructing the computing system to execute a task, wherein the task is associated with a request to implement an execution guarantee for the task, wherein the execution guarantee specifies that the task is to be successfully executed on the on-demand code execution system no more than a desired number of times for instructions including a first execution identifier, wherein the execution guarantee is not implemented for instructions not including the first execution identifier, wherein the task is associated with code executable to implement functionality corresponding to the task, and wherein the first instructions include the first execution identifier;
 obtaining an execution record corresponding to the first execution identifier and indicating a history of executions of the task;
 verifying, from at least the execution record, that a number of other executions of the task that are associated with the first execution identifier and that have successfully occurred or are occurring is less than the desired number of times associated with the first execution identifier; and
 in response to verifying that the number of the other executions of the task that are associated with the first execution identifier and that have successfully occurred or are occurring is less than the desired number of times associated with the first execution identifier, responding to the first instructions at least by:
  generating an execution environment on the on-demand code execution system in which to execute the task;
  initiating an execution of the task on the on-demand code execution system within the execution environment; and
  recording a state of execution of the task within the execution record;
 obtaining, from the one or more devices external to the computing system, second instructions instructing the computing system to execute the task, the second instructions including the first execution identifier associated with the request to verify that, for instructions including the first execution identifier, the task is successfully executed on the on-demand code execution system no more than the desired number of times; and
 responding to the second instructions at least by:
  verifying, from at least the execution record, that the number of the other executions of the task that are associated with the first execution identifier and that have successfully occurred or are occurring is not less than the desired number of times associated with the first execution identifier; and
  declining to execute the task on the on-demand code execution system; and
 obtaining, from the one or more devices external to the computing system, third instructions instructing the system to execute the task, the third instructions not including the first execution identifier associated with the request, and in response to the third instructions not including the first execution identifier, initiating an additional execution of the task on the on-demand code execution system without implementing the execution guarantee.

6. The computer-implemented method of claim 5 further comprising:
 determining that the state of execution of the task indicates an error;
 rolling back the execution of the task; and
 initiating a second execution of the task.

7. The computer-implemented method of claim 6, wherein rolling back the execution of the task comprises executing an undo function associated with the task.

8. The computer-implemented method of claim 7, wherein the undo function is included within at least one of the code of the task or code of a second task.

9. The computer-implemented method of claim 5 further comprising:
 during execution of the task, detecting a call to at least one of a second task on the on-demand code execution system or an external service; and
 appending, within the call, a second execution identifier.

10. The computer-implemented method of claim 9, wherein the second execution identifier matches the first execution identifier.

11. The computer-implemented method of claim 9 further comprising:
 determining that the state of execution of the task indicates an error; and
 generating a second call, including the second execution identifier, to at least one of the second task or the external service indicating that execution of the task has resulted in an error.

12. The computer-implemented method of claim 11, wherein determining that the state of execution of the task indicates an error includes at least one of determining that the execution of the task outputted an error, or determining that an execution environment executing the task has become unhealthy.

13. Non-transitory computer-readable media including computer-executable instructions that, when executed by a computing system, cause the computing system to:
 obtain, from one or more devices external to the computing system, first instructions instructing the computing system to execute a task, wherein the task is associated with code executable to implement functionality corresponding to the task, wherein the task is associated with a request to implement an execution guarantee for the task, wherein the execution guarantee specifies that the task is to be successfully executed on an on-demand code execution system no more than a desired number of times for instructions including a first execution identifier, wherein the execution guarantee is not implemented for instructions not including the first execution identifier, and wherein the instructions include the first execution identifier;
 verify, from an execution record corresponding to the first execution identifier and indicating a history of executions of the task, that a number of other executions of the task that are associated with the first execution identifier and that have successfully occurred or are occurring is less than the desired number of times associated with the first execution identifier; and
 in response to verifying that the number of the other executions of the task that are associated with the first execution identifier and that have successfully occurred or are occurring is less than the desired number of times associated with the first execution identifier, responding to the first instructions at least by:
- generating an execution environment on the on-demand code execution system in which to execute the task;
- initiating an execution of the task on the on-demand code execution system within the execution environment; and
- recording a state of execution of the task within the execution record;

obtain, from the one or more devices external to the computing system, second instructions instructing the computing system to execute the task, the second instructions including the first execution identifier associated with the request to verify that, for instructions including the first execution identifier, the task is successfully executed on the on-demand code execution system no more than the desired number of times; and respond to the second instructions at least by:
- verifying, from at least the execution record, that the number of the other executions of the task that are associated with the first execution identifier and that have successfully occurred or are occurring is not less than the desired number of times associated with the first execution identifier; and
- declining to execute the task on the on-demand code execution system; and obtain, from the one or more devices external to the computing system, third instructions instructing the system to execute the task, the third instructions not including the first execution identifier associated with the request, and in response to the third instructions not including the first execution identifier, initiate an additional execution of the task on the on-demand code execution system without implementing the execution guarantee.

14. The non-transitory computer-readable media of claim 13, wherein the computer-executable instructions further cause the computing system to:
- determine that the execution record corresponding to the first execution identifier does not exist; and
- generate the execution record corresponding to the first execution identifier.

15. The non-transitory computer-readable media of claim 13, wherein the computer-executable instructions further cause the computing system to:
- determine that the state of execution of the task indicates an error;
- rollback the execution of the task; and
- initiate a second execution of the task.

16. The non-transitory computer-readable media of claim 13, wherein the computer-executable instructions further cause the computing system to:
- during execution of the task, detect a call to at least one of a second task on the on-demand code execution system or an external service; and
- determine that the state of execution of the task indicates an error; and
- generate a second call, including the first execution identifier, to at least one of the second task or the external service indicating that execution of the task has resulted in an error.

17. The non-transitory computer-readable media of claim 13, wherein the computer-executable instructions further cause the computing system to:
- obtain additional instructions to execute the task, wherein the additional instructions include a second execution identifier;
- generate a new execution record for the task, wherein the new execution record corresponds to the second execution identifier; and
- allocate additional computing resources on the on-demand code execution system in which to execute the task;
- initiate a second execution of the task on the on-demand code execution system utilizing the additional allocated computing resources; and
- record a state of the second execution of the task within the new execution record corresponding to the second execution identifier.

18. The non-transitory computer-readable media of claim 13, wherein the task is associated with a plurality of stages, wherein instructions include a stage indicator identifying one of the plurality of stages, and wherein the computer-executable instructions further cause the computing system to verify, from the execution record, that the stage indicator identifies a stage later than a latest stage indicated in the execution record as having executed successfully.

* * * * *